(12) United States Patent
Kimura

(10) Patent No.: US 8,952,879 B2
(45) Date of Patent: Feb. 10, 2015

(54) HOLD TYPE IMAGE DISPLAY SYSTEM

(71) Applicant: Gold Charm Limited, Apia (WS)

(72) Inventor: Hiroaki Kimura, Kanagawa (JP)

(73) Assignee: Gold Charm Limited, Apia (WS)

( * ) Notice: Subject to any disclaimer, the term of this patent is extended or adjusted under 35 U.S.C. 154(b) by 0 days.

(21) Appl. No.: 13/950,383

(22) Filed: Jul. 25, 2013

(65) Prior Publication Data

US 2014/0028640 A1 Jan. 30, 2014

Related U.S. Application Data

(63) Continuation of application No. 12/039,807, filed on Feb. 29, 2008, now abandoned.

(30) Foreign Application Priority Data

Mar. 29, 2007 (JP) .................................. 2007-086191

(51) Int. Cl.
  *G09G 3/36* (2006.01)
  *H04N 5/66* (2006.01)
  *G09G 3/34* (2006.01)

(52) U.S. Cl.
  CPC ............... *G09G 3/36* (2013.01); *G09G 3/3614* (2013.01); *H04N 5/66* (2013.01); *G09G 3/3666* (2013.01); *G09G 3/342* (2013.01); *G09G 2310/061* (2013.01); *G09G 2320/0257* (2013.01); *G09G 2320/0261* (2013.01); *G09G 2320/046* (2013.01); *G09G 2320/062* (2013.01); *G09G 2320/106* (2013.01); *G09G 2310/024* (2013.01)

USPC ............................................. 345/96; 345/102

(58) Field of Classification Search
  CPC ................ G09G 3/3614; G09G 3/342; G09G 2310/024; G09G 2310/061; G09G 2310/0257; G09G 2310/0261
  USPC .......................... 345/87, 98–100, 102, 103, 96
  See application file for complete search history.

(56) References Cited

U.S. PATENT DOCUMENTS

| | | | |
|---|---|---|---|
| 5,936,676 A | 8/1999 | Ledinh et al. | |
| 2005/0162448 A1* | 7/2005 | Aoki | 345/690 |
| 2006/0001628 A1* | 1/2006 | Kawaguchi | 345/89 |
| 2006/0170822 A1 | 8/2006 | Baba et al. | |
| 2007/0115241 A1* | 5/2007 | Teranishi | 345/98 |
| 2007/0182700 A1* | 8/2007 | Baba et al. | 345/102 |
| 2007/0211009 A1* | 9/2007 | Teranishi | 345/98 |

* cited by examiner

*Primary Examiner* — Allison Johnson
(74) *Attorney, Agent, or Firm* — Novak Druce Connolly Bove + Quigg LLP

(57) ABSTRACT

A hold type image display system for displaying a video on a display panel includes a source driver for outputting a video signal to a source line, a gate driver for outputting a scanning signal to a gate line; and a controller for receiving an input video signal and thereby controlling the source driver and the gate driver. The controller outputs a video signal in which a black or gray line is inserted between video lines to the source driver, outputs a start pulse signal for writing the video lines for one or more times and a start pulse signal for writing black or gray lines for one or more times to the gate driver within one frame period, and independently inverts a write polarity of the video signal and a write polarity of the black or gray signal in frame periods in each frame cycle.

18 Claims, 20 Drawing Sheets

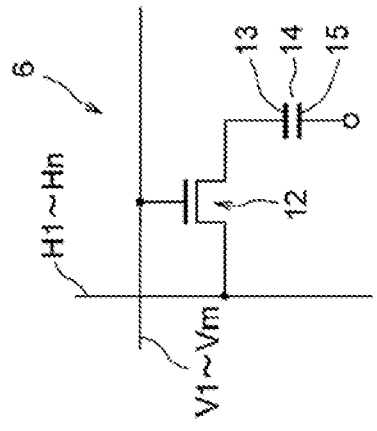
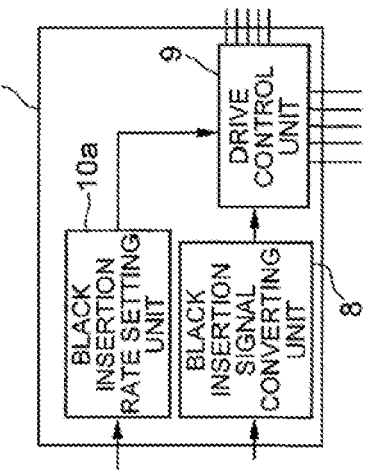
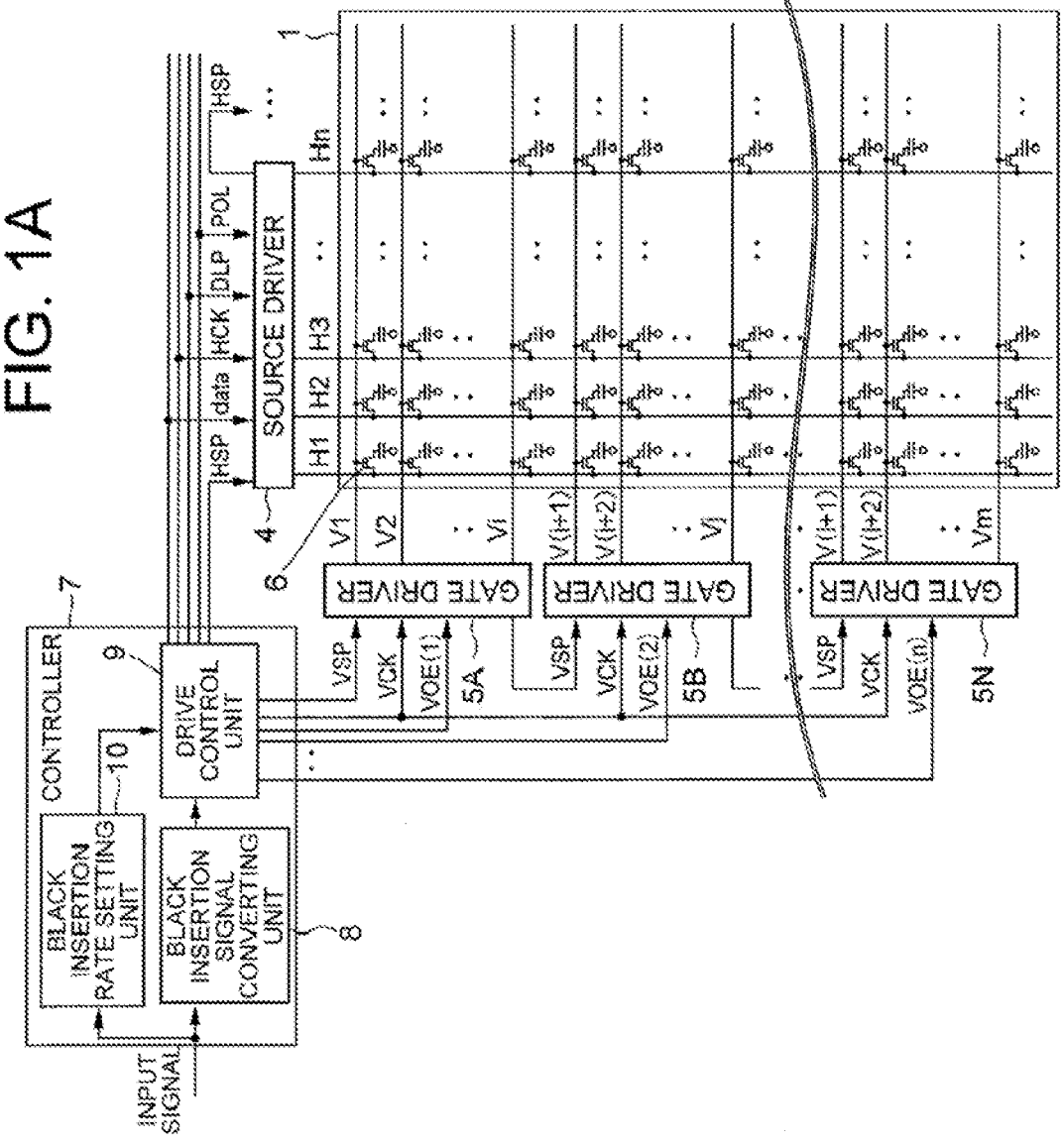
FIG. 1A
FIG. 1B
FIG. 1C

VERTICAL 2-DOT INVERSION ②

INVERSION OF POLARITY PATTERN ①

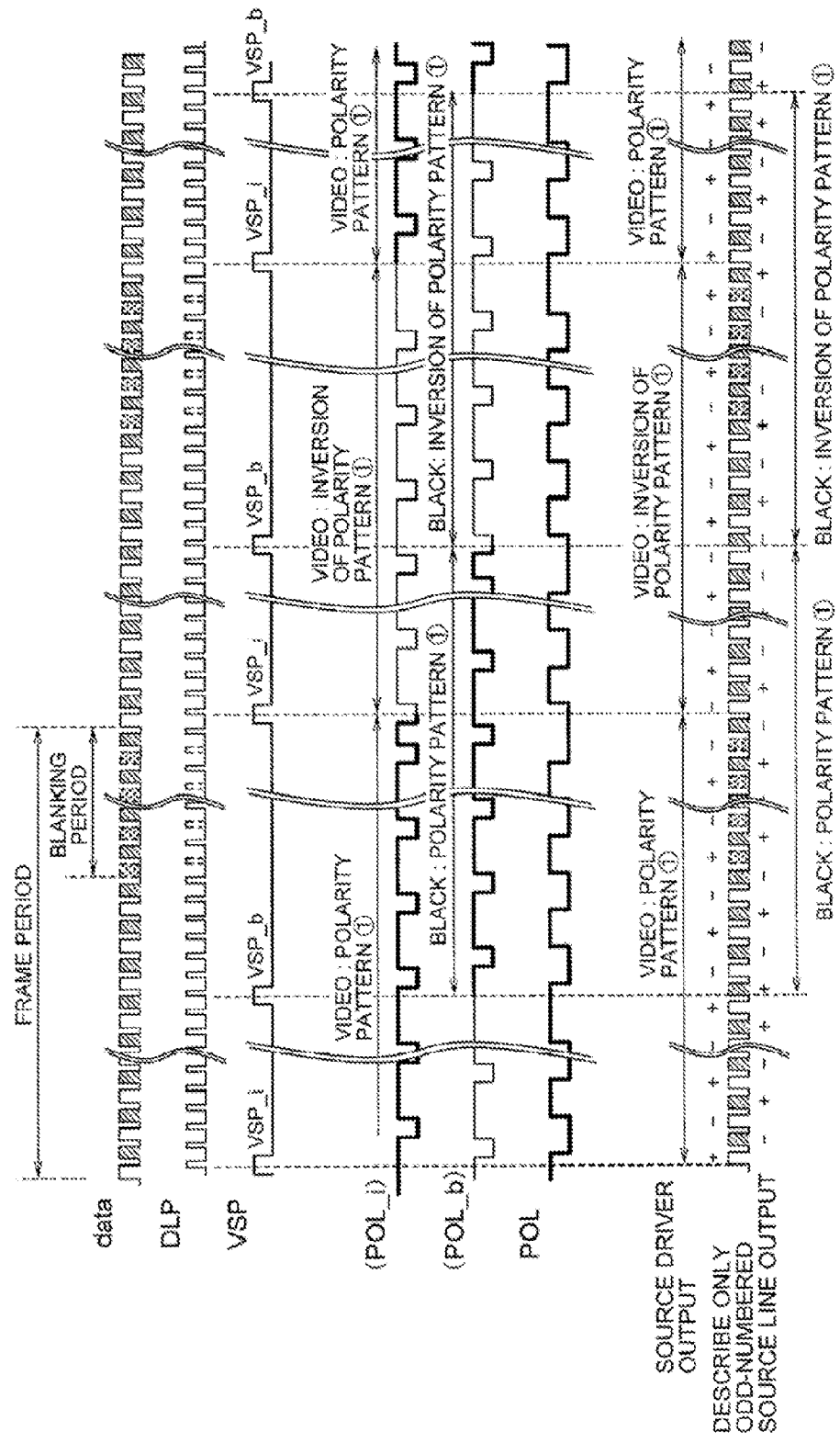

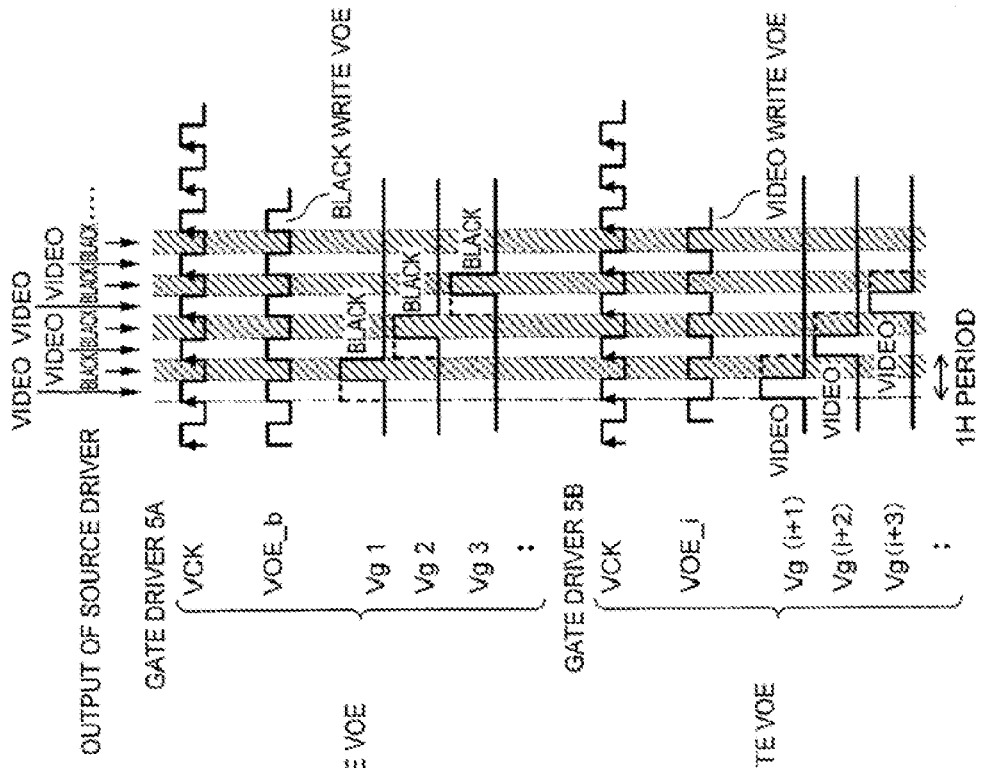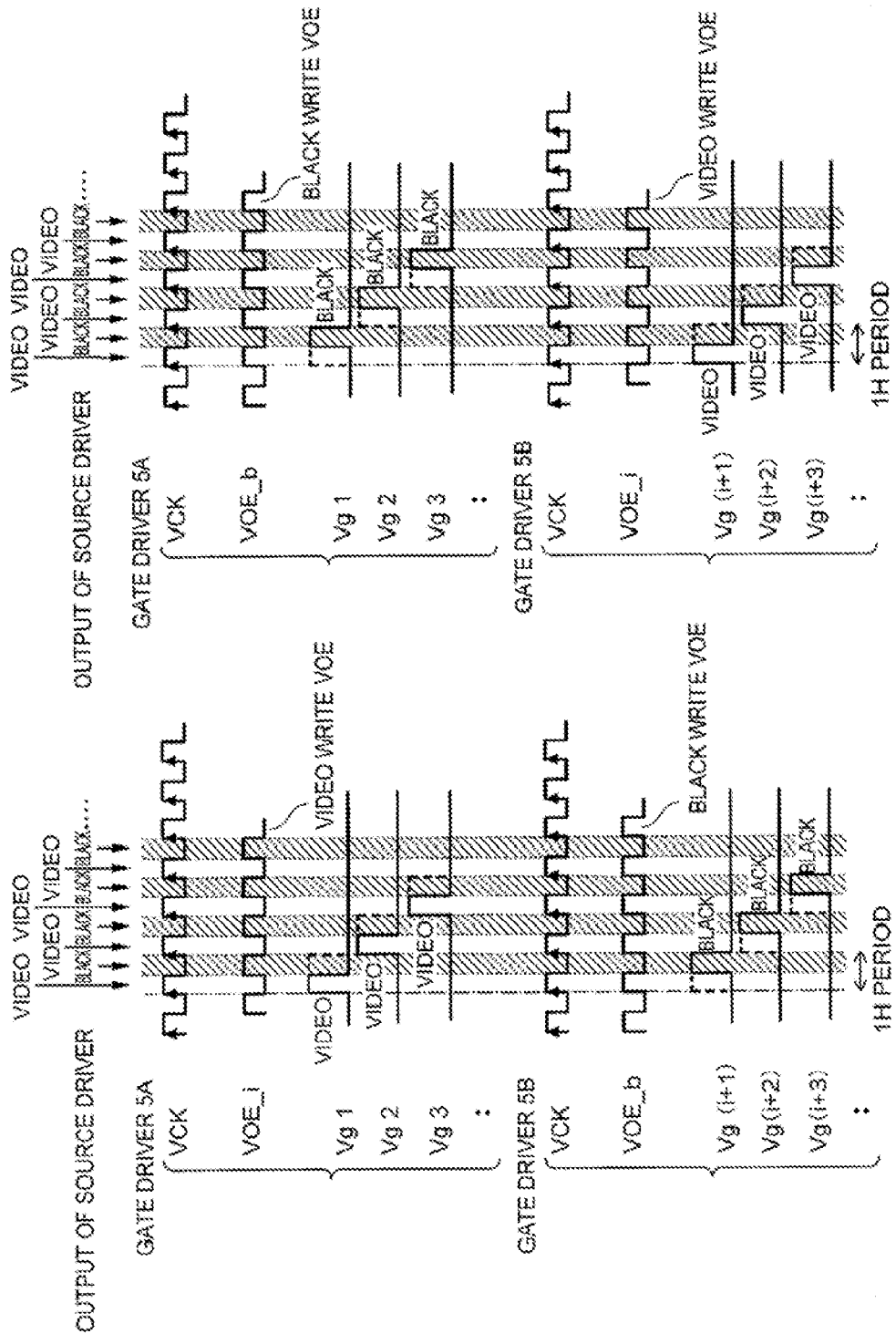

FIG. 15

MOVEMENT DISTANCE CALCULATION BLOCK

| (0,0) | (1,0) | (2,0) | (3,0) | ... |
|-------|-------|-------|-------|-----|
| (0,1) | (1,1) | (2,1) | (3,1) | ... |
| (0,2) | (1,2) | (2,2) | (3,2) | |

HOLD TYPE IMAGE DISPLAY SYSTEM

CROSS REFERENCE TO RELATED APPLICATIONS

This application is a continuation of U.S. patent application Ser. No. 12/039,807, filed Feb. 29, 2008, which claims priority from Japanese Patent Application No. 2007-086191, filed on May 29, 2007, and Japanese Patent Application No. 2008-039352, filed on Feb. 20, 2008, the contents of all of which is incorporated herein by reference in their entirety.

BACKGROUND

1. Technical Field

The present invention relates to image display devices and image display methods thereof, and image display programs, in particular, to a hold type image display system.

2. Description of Related Art

A liquid crystal display (LCD) is being widely used since it is thin and does not occupy as much installation area compared to a CRT (Cathode Ray Tube) display. However, in the hold type display device such as LCD, an image is continued through a frame period as opposed to an impulse type display device such as CRT display, and thus a moving image tends to become unclear.

In the case of the impulse type display device, an image is displayed as a pulse at an early stage in the frame and a black display is displayed until the next frame, and thus the after-image occurrence is adjusted not to be recognized by the user's eyes. In the case of the hold type display device, on the other hand, the image is held and displayed as a still image within the frame period, and the moving image is displayed by switching the screen for every frame, and thus the still image is seamlessly switched from one frame to another, whereby the user recognizes the previous frame image as an afterimage, senses a double image in which the shifted images are overlapped and recognizes a moving image blur. In order to reduce the moving image blur in the hold type display device, a hold type display device for pseudo-driving in an impulse type display is disclosed in Japanese Patent Publication No. 3385530 (patent document 1) and Japanese Laid-Open Patent Publication No. 2001-166280 (patent document 2).

Since the liquid crystal generally deteriorates when a direct current component is applied to the liquid crystal over a long period of time in the liquid crystal display device, a frame inversion drive of inverting the voltage polarity applied to the pixel for every frame is performed.

However, in most liquid crystal display devices pseudo-driven in the impulse type display, a black signal and a video signal are alternately written to each pixel at a constant cycle, and thus only the black signal is written in one polarity and only the video signal is written in the other polarity if the cycle of inversion drive and the cycle of black insertion coincide, whereby the DC component is applied to the liquid crystal panel causing burning of the liquid crystal panel and degradation in lifetime.

In the method disclosed in patent document 1, in order to improve such drawbacks, the polarity is inverted at a cycle of double the cycle of black insertion in the black insertion drive of alternately repeating the black signal and the video signal for every frame. In the case of the black insertion drive repeated for every frame, to which pixel of the display screen each black signal is used can be easily defined, and thus burning of the liquid crystal panel and degradation in lifetime can be avoided by forming a sequence with the switching of the frames of the video signal as a base point.

However, in the display device of patent document 2 configured as shown in FIG. 18, since the black insertion drive of inserting the black image at a specific proportion within one frame is performed, to which pixel of the display screen the black signal is used differs depending on a black insertion rate, and the black signal is positioned in the middle of the display screen at the switching of the frames of the video signal, whereby it is difficult to form a sequence of inversion with the switching of the frames of the video signal as the base point.

Patent document 1 discloses a method of inverting the polarity for every two outputs of the video signal and the black signal following thereto, where if such method is used in the device of patent document 2, the order of inversion of the black signal and the video signal changes at the middle of the screen, as shown in FIG. 19, whereby luminance difference and burning might occur at the display with a line as a boundary at which the polarity inversion switches according to variation in field through of the panel surface and variation in positive and negative of the application voltage (see FIG. 20).

It is an exemplary object of the present invention to provide a hold type image display system capable of flexibly responding to switching of black insertion rate, and capable of preventing display luminance difference and burning at the line at which the polarity inversion switches as a boundary.

SUMMARY OF THE INVENTION

To achieve the exemplary object, a hold type image display system according to an exemplary aspect of the invention relates to a hold type image display system for displaying a video on a display panel by controlling a video signal to be input to a source line and a gate line of the display panel, the hold type image display system including a source driver for outputting a video signal to the source line; a gate driver for outputting a scanning signal to the gate line; and a controller for receiving an input video signal and thereby controlling the source driver and the gate driver; wherein the controller outputs a video signal in which a black or gray line is inserted between video lines to the source driver, outputs a start pulse signal for writing the video lines for one or more times and a start pulse signal for writing black or gray lines for one or more times to the gate driver within one frame period, inverts a write polarity of the video signal and a write polarity of the black or gray signal in frame cycle, and scrolls a black band in a screen of the display panel during one frame.

A control system of the hold type image display system according to another exemplary aspect of the invention relates to a control system of a hold type image display system for displaying a video on a display panel by controlling a video signal to a source line of the display panel in a source driver and controlling a signal to a gate line of the display panel in a gate driver; the control system including a controller for receiving an input video signal and thereby controlling the source driver and the gate driver; wherein the controller outputs a video signal in which a black or gray line is inserted between video lines to the source driver, outputs a start pulse signal for writing the video lines for one or more times and a start pulse signal for writing black or gray lines for one or more times to the gate driver within one frame period, inverts a write polarity of the video signal and a write polarity of the black or gray signal in frame cycle, and scrolls a black band in a screen of the display panel during one frame.

A hold type image display method according to still another exemplary aspect of the invention relates to a hold type image display method for displaying a video on a display panel by controlling a video signal to a source line of a display panel in a source driver and controlling a signal to a gate line of the display panel in a gate driver, the hold type image display method including the steps of outputting a video signal in which a black or gray line is inserted between video lines to the source driver; outputting a start pulse signal for writing the video lines for one or more times and a start pulse signal for writing black or gray lines for one or more times to the gate driver within one frame period; scrolling a black band in a screen of the display panel during one frame; and inverting a write polarity of the video signal and a write polarity of the black or gray signal in frame cycle.

A control program of the hold type image display system according to still another exemplary aspect of the invention relates to a control program of a hold type image display system for displaying a video on a display panel by controlling a signal to a source line of a display panel in a source driver and controlling a signal to a gate line of the display panel in a gate driver, the control program of the hold type image display causing a computer to execute a function of outputting a video signal in which a black or gray line is inserted between video lines to the source driver; a function of outputting a start pulse signal for writing the video lines and a start pulse signal for writing black or gray lines to the gate driver; a function of inverting a write polarity of the video signal and a write polarity of the black or gray signal in frame cycle; and a function of scrolling a black band in a screen of the display panel during one frame.

As an exemplary advantage according to the invention, the present invention can finely adjust the black image insertion rate with respect to one frame period while taking into consideration the balance between the merit of reducing the moving image blur and the demerit of lowering in luminance in the hold type display device, and display luminance difference and burning having a line at which the polarity inversion switches as a boundary caused by variation in field through of the display panel surface and variation in positive and negative of application voltage are prevented.

BRIEF DESCRIPTION OF THE DRAWINGS

FIG. 1A is a view showing a configuration of an image display device of a first exemplary embodiment according to the present invention. FIG. 1B is a cross sectional view showing a configuration of a pixel, and FIG. 1C is a view showing another configuration example of a controller;

FIG. 6 is a timing chart showing one example of a frame polarity inversion drive in the image display device of the exemplary embodiment shown in FIG. 1A;

FIGS. 7A and 7B are timing charts of a signal propagating through the image display device of the exemplary embodiment shown in FIG. 1A;

FIG. 15 is a view showing the operation of the black insertion rate setting unit in the exemplary embodiment shown in FIG. 12;

DETAILED DESCRIPTION

An exemplary embodiment of the present invention will be described in detail based on the drawings.

Figure 12:
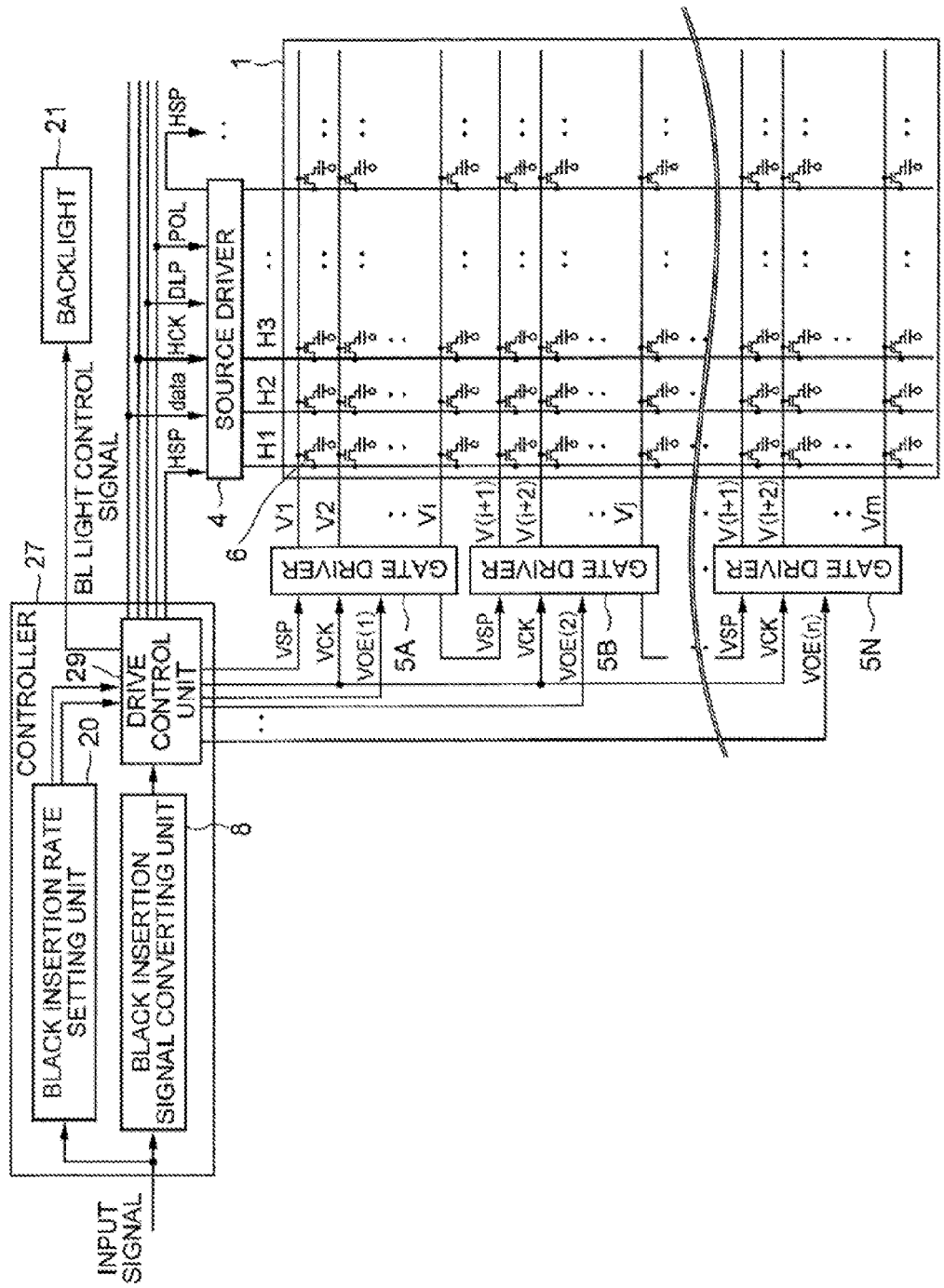
FIG. 12 is a view showing a configuration of an image display device according to a second exemplary embodiment of the present invention.

As shown in FIG. 1 and FIG. 12, a hold type image display system according to an exemplary embodiment of the present invention addresses a hold type image display system for displaying a video on a display panel by controlling signals to be input to source lines H1, H2, . . . , Hn and gate lines V1, V2, . . . , Vn of the display panel, and includes a source driver 4 for outputting a video signal to the source lines H1, H2, Hn, gate drivers 5A, 5B, . . . , 5N for outputting a scanning signal to the gate lines V1, V2, . . . , Vn, and a controller 7 for drive controlling the source driver and the gate driver, as a basic configuration. The controller 7 outputs a video signal (hereinafter referred to as black insertion video signal) in which a black line (hereinafter referred to as just "black" collectively) is inserted between the video lines to the source driver 4 (FIGS. 2 and 8 etc.), outputs a start pulse signal for writing the video lines for one or more times and a start pulse signal for writing a black line for one or more times to the gate drivers 5A, 5B, . . . , 5N within one frame period, and inverts the write polarity of the video signal and the write polarity of the black signal in frame cycle (FIGS. 3 to 7 etc.)

In the exemplary embodiment of the present invention, the video is displayed on the display panel by controlling the signal to the source line of the display panel in the source driver and controlling the signal to the gate line of the display panel in the gate driver, where in the video display, a video signal in which a black line is inserted between the video lines is output to the source driver, a start pulse signal for writing the video lines and a start pulse signal for writing a black line are output to the gate drivers, and the write polarity of the video signal and the write polarity of the black signal are inverted in frame cycle.

Specifically describing, the controller 7 determines the black insertion rate when data of black insertion rate is input to the controller 7 by determination of each user, and the like. Furthermore, the controller 7 inserts the black signal between the lines of the input video signal. The controller 7 inputs a control signal of the driver including a polarity inverting signal (POL) determined at a timing complying with the black insertion rate along with the video signal inserted with the black signal to the gate drivers 5A, 5B, . . . , 5N and the source driver 4.

Figure 2:
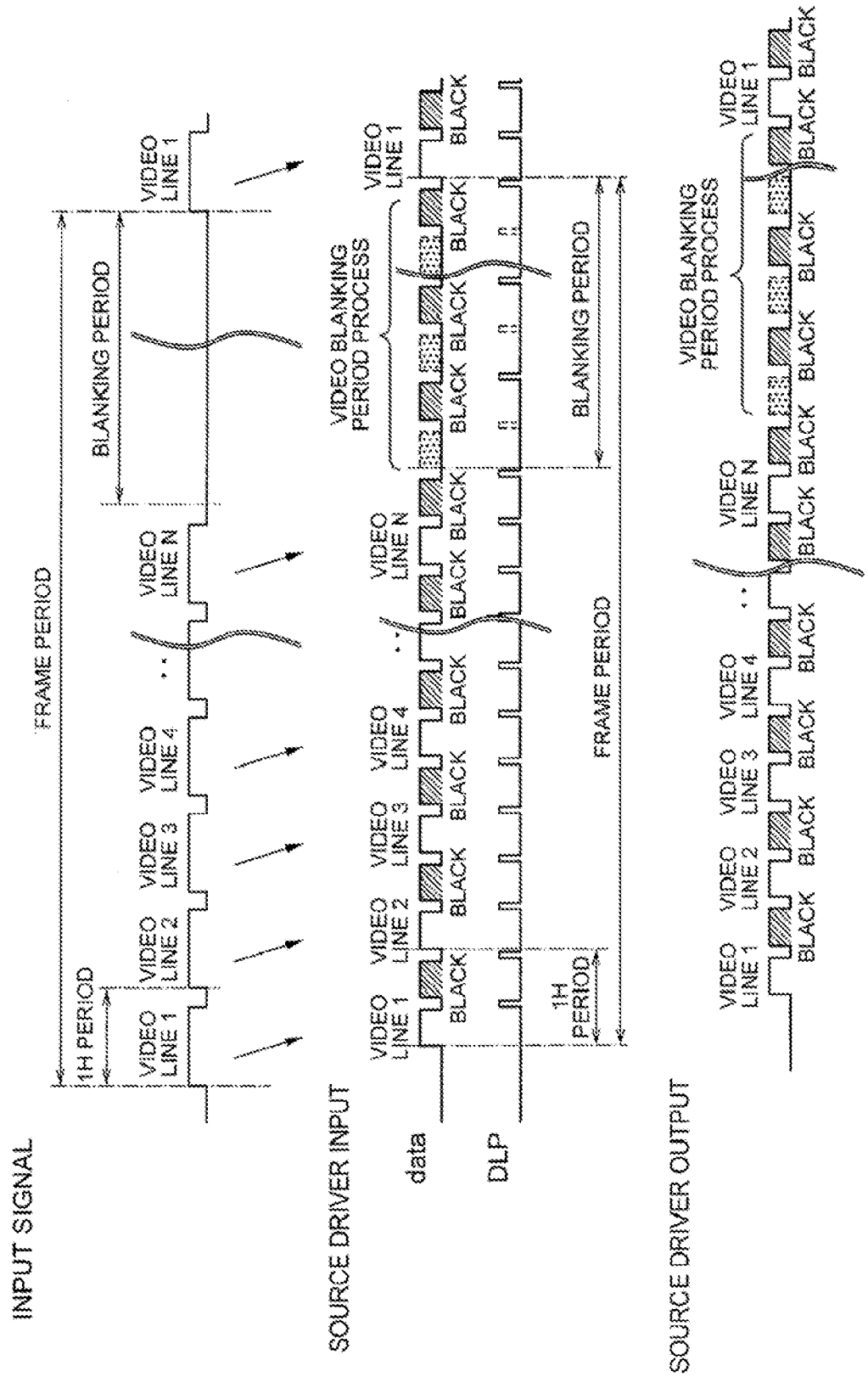
FIG. 2 is an explanatory view showing a step of creating a black insertion image signal in the exemplary embodiment shown in FIG. 1A.

The details of the black insertion drive in the exemplary embodiment of the present invention will be described using FIGS. 2 and 7. As shown in FIG. 2, the controller 7 inputs the video signal in which the black signal is inserted between the lines of the video signal to the source driver 4. The source driver 4 alternately outputs the video signal and the black signal to the display panel in the order of input signal.

Specifically describing, when writing the video signal to one of the lines of the gate driver 5A and writing the black signal to one of the lines of the gate driver 5B of the gate drivers 5A, 5B, . . . , 5N in 1H period, as shown in FIG. 7A, the controller 7 inputs a video signal write enable signal (VOE_i) for turning OFF the gate to the gate driver 5A during the period the source driver 4 outputs the black signal, and inputs a black signal write enable signal (VOE_b) for turning OFF the gate to the gate driver 5B during the period the source driver 4 outputs the video signal.

On the other hand, when writing the black signal to one of the lines of the gate driver 5A and writing the video signal to one of the lines of the gate driver 5B in 1H period, as shown in FIG. 7B, the controller 7 inputs the black signal write enable signal (VOE_b) to the gate driver 5A, and inputs the video signal write enable signal (VOE_i) to the gate driver 5B.

Thus, the video signal and the black signal can be written to two lines at different positions in the 1H period by controlling the source driver 4 and the gate driver 5A, 5B, . . . , 5N through the controller 7.

Figure 8:
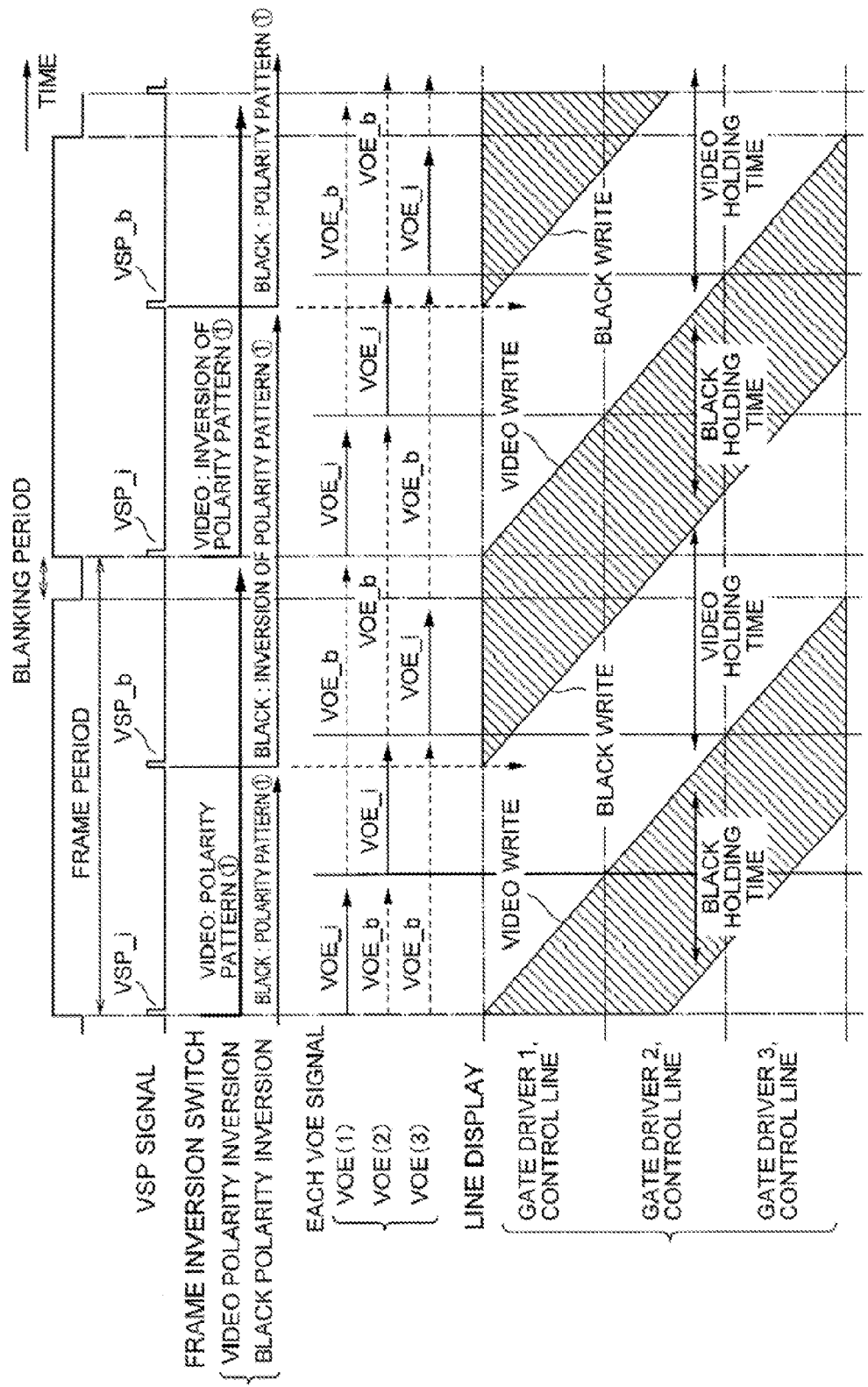
FIG. 8 is an explanatory view showing the operation of the image display device of the exemplary embodiment shown in FIG. 1A.

The details of black insertion using a method of writing the video signal and the black signal will be described using FIG. 8. In the exemplary embodiment of the present invention, the controller 7 inputs a start pulse signal (VSP_i) for writing the video lines of one or more times and a start pulse signal (VSP_b) for writing the black line of one or more times to the gate driver, as shown in FIG. 8. The controller 7 inputs the video signal start pulse signal (VSP_i) at the start of the frame, and sequentially turns ON the TFT of the display panel (liquid crystal panel) while shifting (scanning) the lines of the screen by the gate driver.

The controller 7 inputs the black signal start pulse signal (VSP_b) within the frame period such as the middle according to the black insertion rate, and sequentially turns ON the TFT of the display panel (liquid crystal panel) while shifting (scanning) the lines of the screen by the gate driver.

Figure 9:
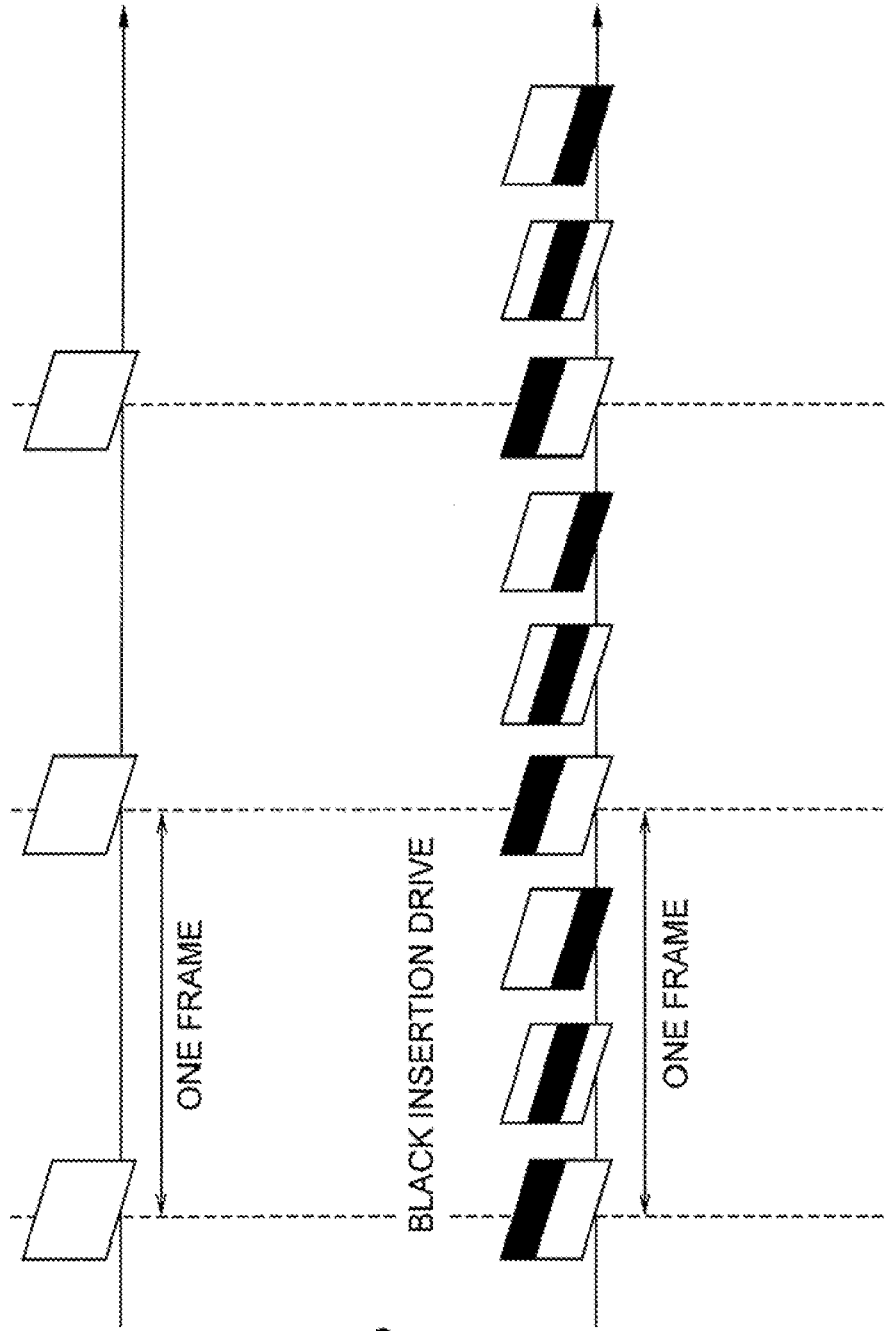
FIGS. 9A and 9B are explanatory views showing a moving image display in the image display device of the exemplary embodiment shown in FIG. 1A.
Figure 10:
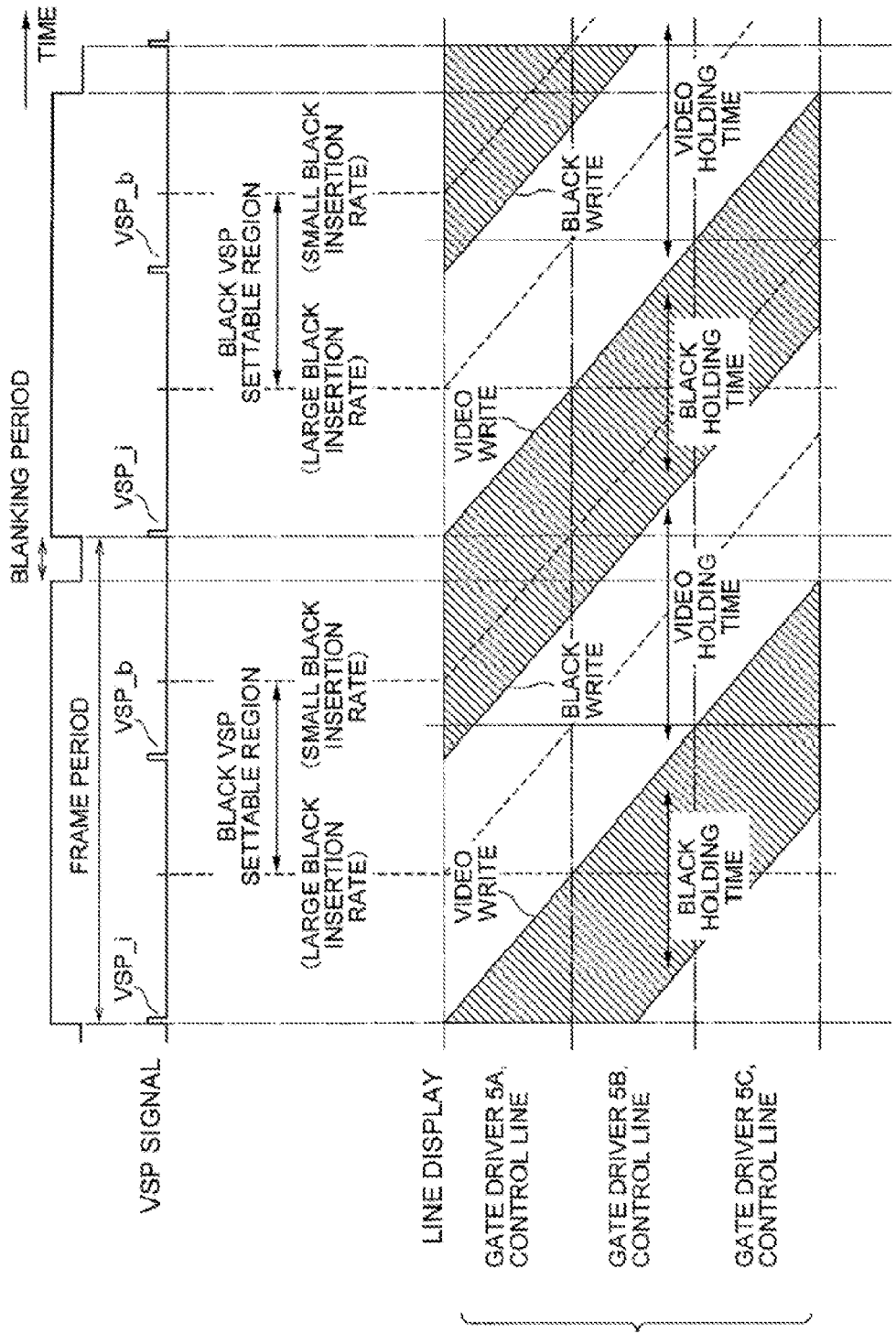
FIG. 10 is an explanatory view showing the operation of the image display device of the exemplary embodiment shown in FIG. 1A.

When the controller 7 drive controls the gate driver in the above manner, a black insertion drive in which a black band scrolls the screen display at the display panel in one frame, and the black insertion rate is adjusted by changing the width of the black band is realized, as shown in FIG. 9B. As shown in FIG. 10, the black signal start pulse (VSP_b) can be input at an arbitrary timing as long as the lines of the video signal and the black signal are not simultaneously selected with one gate driver, and thus there is no limitation by timing of a break of the driver and the like.

A write polarity inversion drive according to an exemplary embodiment of the present invention will now be described. In the black insertion drive in which the black insertion rate can be adjusted, at which pixel of the display screen the black signal is used changes according to the black insertion rate, and furthermore, the black signal is positioned in the middle of the display screen at the switching of the frames of the video signal. Thus, as shown in FIGS. 7A and 7B, the controller 7 performs a frame inversion on the write polarity for writing the video signal, with a timing of inputting the image signal start pulse (VSP_i) as the base point, and independent therefrom, performs a frame inversion on the write polarity for writing the black signal, with a timing of inputting the black signal start pulse (VSP_b) as a base point.

Therefore, the controller 7 outputs the video signal in which the black line is inserted between the video lines to the source driver 4, outputs the start pulse signal for writing the video lines and the start pulse signal for writing the black line to the gate drivers 5A, 5B, . . . , 5N, and inverts the write polarity of the video signal and the write polarity of the black signal in frame cycle to eliminate display luminance difference and burning having the line at which the polarity inversion switches as a boundary generated by variation in field through of the display panel surface and variation in positive and negative of the application voltage.

In the above configuration, the exemplary embodiment of the present invention is built as a hold type image display system serving as hardware, but the functions executed by the controller 7 may be built as a program to be processed in a personal computer. In this case, the control program of the hold type image display system according to the exemplary embodiment of the present invention is built with a configuration for causing a computer to execute a function of outputting the video signal in which a black line is inserted between the video lines to the source driver, a function of outputting the start pulse signal for writing the video lines and the start pulse signal for writing a black line to the gate drivers, and a function of inverting the write polarity of the video signal and the write polarity of the black signal in frame cycle.

The exemplary embodiment of the present invention will be further described using specific examples.

First Exemplary Embodiment

An example in which at least two gate drivers capable of collectively enabling the gate output with respect to a plurality of gate lines of a display panel are arranged will be described as a first exemplary embodiment of the present invention.

As shown in FIG. 1A, a display panel 1 of the image display device of the first exemplary embodiment of the present invention has a configuration in which m (m is a natural number) gate lines V1 to Vm and n (n is a natural number) source lines H1 to Hn are arrayed so as to intersect each other to a matrix form, and a pixel 6 is formed at each intersection of the gate lines and the source lines. A source driver 4 is connected to the source lines H1 to Hn, the gate lines V1 to Vn are divided into a plurality of gate line groups, and gate drivers 5A to 5N are connected to the gate lines of each gate line group.

In the example of FIG. 1A, the gate driver 5A is connected to the gate lines V1 to Vi of the gate line group, the gate driver 5B is connected to the gate lines V(i+i) to Vj of the gate line group, and the gate driver 5N is connected to the gate lines V(1+1) to Vm of the gate line group.

As shown in FIG. 1B, a circuit of the pixel 6 formed in the display panel 1 is configured by a thin-film transistor (TFT) 12 and a liquid crystal layer 14. The source electrode of the thin-film transistor 12 is connected to the source lines H1 to Hn, a gate electrode of the TFT 12 is connected to the gate lines V1 to Vm, and a drain electrode of the TFT 12 is connected to a pixel electrode 13 formed on a glass substrate (not shown). A liquid crystal layer 14 is interposed between the pixel electrode 13 and a common electrode 15 that form a pair. The circuit configuration of the pixel 6 is universal.

The video display by the pixels 6 of the display panel 1 is carried out with the optical transmittance of the liquid crystal layer 14 controlled by the potential difference between the pixel electrode 13 and the common electrode 15. Specifically, when the video signal is written to the pixel 6, the gate-ON signal (Vg1 to Vgm) transmitted via the gate lines V1 to Vm from the gate drivers 5A, 5B, . . . , 5N turns ON the TFT 12 thereby applying the tone voltage, which corresponds to the video signal provided from the source driver 4 to the source lines H1 to Hn, to the pixel electrode 13, and a video display on the display panel 1 based on the video signal is realized while controlling the optical transmittance of the liquid crystal layer 14 by the potential difference between the voltage of the common electrode 15 and the tone voltage of the pixel electrode 13.

As shown in FIG. 1A, the image display device of the first exemplary embodiment includes the controller 7 for controlling the operation of the source driver 4 and the gate drivers 5A to 5N. As shown in FIG. 1A, the controller 7 includes a black insertion signal converting unit 8, a drive control unit 9, and a black insertion setting unit 10. The black insertion signal converting unit 8 inserts a black image signal between the lines of the video signal, that is, inserts the black image signal to the input video signal, creates a black insertion video signal containing a video signal portion and a black image signal portion within a horizontal scanning period, and outputs the same. The black insertion rate setting unit 10 determines the black insertion rate by determination of each user. The drive control unit 9 inputs, along with the video signal inserted with the black signal output by the black insertion signal converting unit 8, a control signal of a driver containing a polarity inversion signal (POL) determined at a timing corresponding to the black insertion rate determined in the black insertion setting unit 10 to the source driver 4 and the gate drivers 5A to 5N.

In the first exemplary embodiment of the present invention, the drive control unit 9 of the controller 7 inputs the video signal write enable signal (VOE_i) for turning OFF the gate to the gate driver 5A during the period the source driver 4 outputs the black signal and inputs the black signal write enable signal (VOE_b) for turning OFF the gate 15 to the gate driver 5B during the period the source driver outputs the video signal when writing the video signal to one of the lines of the gate driver 5A and writing the black signal to one of the lines of the gate driver 5B in 1H period, as shown in FIG. 7A.

On the other hand, as shown in FIG. 7B, when writing the black signal to one of the lines of the gate driver 5A and writing the video signal to one of the lines of the gate driver 5B in 1H period, the drive control unit 9 inputs the black signal write enable signal (VOE_b) to the gate driver 5A and inputs the video signal write enable signal (VOE_i) to the gate driver 5B.

The drive control unit 9 writes the video signal and the black signal to two lines at different positions in 1H period by performing the above control.

Specifically describing, at least two gate drivers for collectively enabling the gate output are used, and each gate driver 5A to 5N is controlled by an output enable signal independent from each other from the drive control unit 9.

As shown in FIG. 2, one frame period includes a write period (horizontal scanning period) of the same number as the number (n) of source lines H1 to Hn and a blanking period. The blanking period is set between the last write period (video line N) of the previous frame period and the first write period (video line 1) of the next frame period. In the first exemplary embodiment of the present invention, assuming the portion corresponding to the write period of the input video signal as a line image portion (horizontal scanning period portion), the black insertion signal converting unit 8 inserts the black image signal between the line image portions in the input video signal and similarly inserts the black image signal to the blanking period in the input video signal (data of source driver input of FIG. 2). In FIG. 2, when writing the black image signal in the blanking period, a case of outputting a dummy signal (signal of dotted line pattern in FIG. 2) between the black image signals to be written is shown, but is not limited thereto. The black insertion signal converting unit 8 may similarly insert the black image signal in the case of the input video signal where there is not output of dummy signal in the blanking period. Generally, the video signal in the blanking period does not need to have the dummy signal output between the black image signals when writing the black image signal to the blanking period.

The source driver 4 receives a drive control signal start pulse (HSK), a horizontal clock signal (HCK), a latch signal (DLP), a polarity inversion control signal (POL), and a black insertion signal (data), and alternately outputs the line image portion and the black image portion to the source lines H1 to Hn under the control of the polarity inversion control signal (source driver output of FIG. 2).

Figure 11:
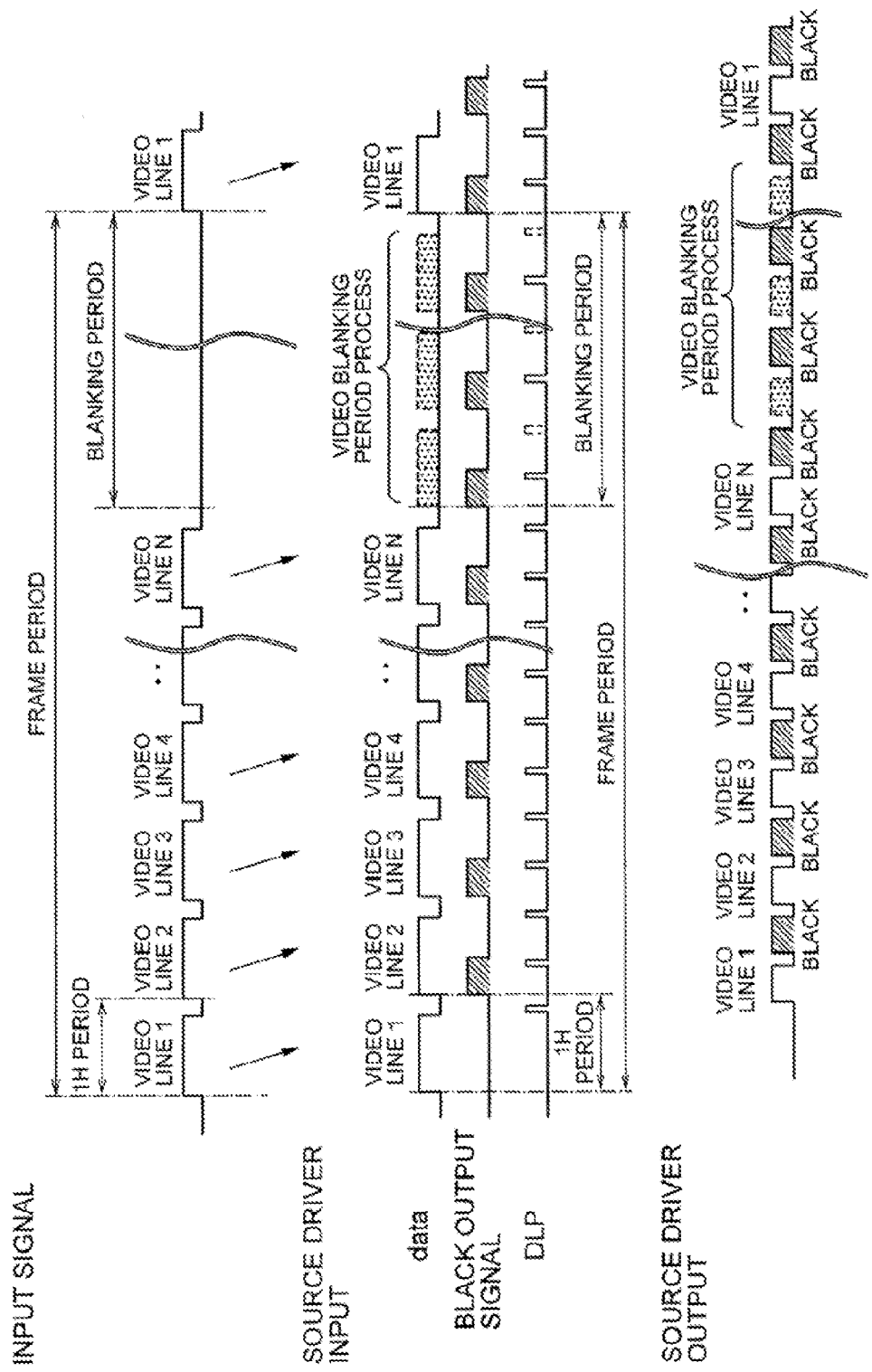
FIG. 11 is an explanatory view showing another example of the step of creating a black insertion image signal in the exemplary embodiment shown in FIG. 1A.

In the first exemplary embodiment, when the drive control unit 9 inputs the black insertion image signal created by the black insertion signal converting unit 8 to the source driver 4, the source driver 4 drives the source lines H1 to Hn at double speed and outputs the black insertion image signal to the source lines H1 to Hn, but is not limited thereto, and the source driver 4 may adjust the output charge to the source lines H1 to Hn to the tone charge corresponding to black display, and output the input video signal to the source lines H1 to Hn while switching the output charge to the tone charge corresponding to the black display at a constant interval, as shown in FIG. 11. With this, the black insertion signal converting unit 8 does not need to be arranged, that is, the line memory necessary for the black image insertion can be reduced, and the drive frequency of the source driver 4 involved in black image insertion does not need to be doubled.

The drive control unit 9 individually provides an output enable signal for controlling opening/closing of the gate output by the gate drivers 5A to 5N to the gate drivers 5A to 5N. Specifically, the drive control unit 9 individually provides, to the gate drivers 5A to 5N, a video display enable signal (VOE_i) for validating the output of the gate-ON signal only during the period the line image portion of the black insertion video signal is being provided to the source lines H1 to Hn, or a black display enable signal (VOE_b) for validating the output of the gate-ON signal only during the period the black image portion of the black insertion video signal is being provided to the source lines H1 to Hn.

Accordingly, each gate driver 5A to 5N is divided into gate line groups, and collectively controls the output on the connected gate lines V1 to Vi. V(i+i) to Vj, . . . , V(1+1) to Vm.

Specifically, the gate drivers 5A to 5N has a function serving as a video displaying device for sequentially providing a video display gate-ON signal of a pulse width for writing only the line image portion of the black insertion video signal to the pixel 6 to the gate lines V1 to Vi, V(i+1) to Vj, V(1+1) to Vm in response to the VOE_i from the drive control unit 9 and sequentially executing the image display scanning, and a function serving as a black displaying device sequentially providing a black display gate-ON signal of a pulse width for writing only the black image portion of the black insertion image signal to the pixel 6 to the gate lines V1 to Vi, V(i+1) to Vj, . . . , V(1+1) to Vm in response to the VOE_b and sequentially executing the black image display scanning.

The drive control unit 9 outputs a video display scanning start pulse (VSP_i) for writing the video signal and a black display scanning start pulse (VSP_b) for writing the black image signal to the gate drivers 5A to 5N one at a time at different timings in one frame period. The drive control unit 9 outputs the VSP_i to the gate drivers 5A to 5N at the start of video display scanning, and at the same time, starts to provide the VOE_i to the gate drivers 5A to 5N. When the video display scanning is terminated at the gate drivers 5A to 5N, the drive control unit 9 starts to provide the VOE_b to the gate drivers 5A to 5N, and outputs the VSP_b to the gate drivers 5A to 5N at a timing to start the black image display scanning.

Furthermore, the controller 7 includes the black insertion rate setting unit 10 for setting the timing of the black display start pulse (VSP_b) by the drive control unit 9 according to the operation environment.

The controller 7 includes the black insertion rate setting unit 10 in the above description, but is not limited thereto. As shown in FIG. 1C, a black insertion rate setting unit 10a may be arranged in place of the black insertion rate setting unit 10. The black insertion rate setting unit 10a is input with data of black insertion rate by the user irrespective of the input signal, and outputs the black insertion rate to the drive control unit 9. When the black insertion rate setting unit 10a is used, the user inputs the data of black insertion rate corresponding to the in-plane luminance difference to the black insertion rate setting unit 10a while looking at the screen. Therefore, the black insertion rate that complies with the user can be set.

The black insertion rate setting unit 10 has a function of determining the black image insertion rate for every frame period while referencing the input video signal, and also has a function of setting the timing of the VSP_b output by the drive control unit 9 in correspondence to the determined black image insertion rate. Specifically, the black insertion rate setting unit 10 includes a frame memory (not shown) for temporarily storing information for one frame of the input video signal sequentially input for every frame; and a determining unit (not shown) for comparing the video signal of one frame of the input video signal and the video signal of the previous frame stored in the frame memory, and determining the optimum black image insertion rate based on the changed data.

Thus, the black image insertion rate for every frame period suited to the driving method, the usage state, and the like of the display panel 1 is determined, and the timing of the VSP_b output for realizing the determined black image insertion rate is set. The timing set here is the timing at which the pixel lines for writing the video signal and for writing the black image signal are not simultaneously selected with one gate driver.

For instance, when receiving the VSP_b from the drive control unit 9 at a timing set by the black insertion rate setting unit 10, the gate driver 5A sequentially provides the VSP_b to the gate lines V1 to Vi as the black display gate-ON signal based on the VOE_b provided in advance, and drive control unit 9 shift outputs the VSP_b to the next gate driver 5B when scanning is terminated.

The drive control unit 9 provides the black insertion video signal (data), and also provides a signal start pulse (HSP), a horizontal clock signal (HCK), a latch signal (DLP), and a polarity inverting control signal (POL), which are signals for drive controlling the source driver 4, to the source driver 4, and provides a scanning start pulse (VSP_i or VSP_b), a vertical clock signal (VCK), and an enable signal (VOE_i or VOE_b), which are signals for drive controlling the gate drivers 5A to 5N.

The source driver 4 starts retrieving data signal by input of HSP, and sequentially accumulates the data signal in a shift register arranged inside in synchronization with the HCK. The source driver 4 confirms the data signal by the input of DLP, and at the same time, confirms positive or negative from the reference voltage according to POL, and outputs the tone voltage corresponding to the data signal to the source lines H1 to Hn.

The polarity inverting control signal (POL) is a control signal for confirming 10 the polarity (positive or negative from the reference voltage) of the tone voltage output from the source driver 4 to the source lines H1 to Hn. The drive control unit 9 controls the POL, executes frame polarity inversion drive such as dot inversion and vertical 2-dot inversion drive shown in FIGS. 3 to 5, inverts the write polarity of the line image portion in frame cycle of VSP_i base point, and inverts the write polarity of the black image portion in frame cycle of VSP_b base point.

Figure 3B:
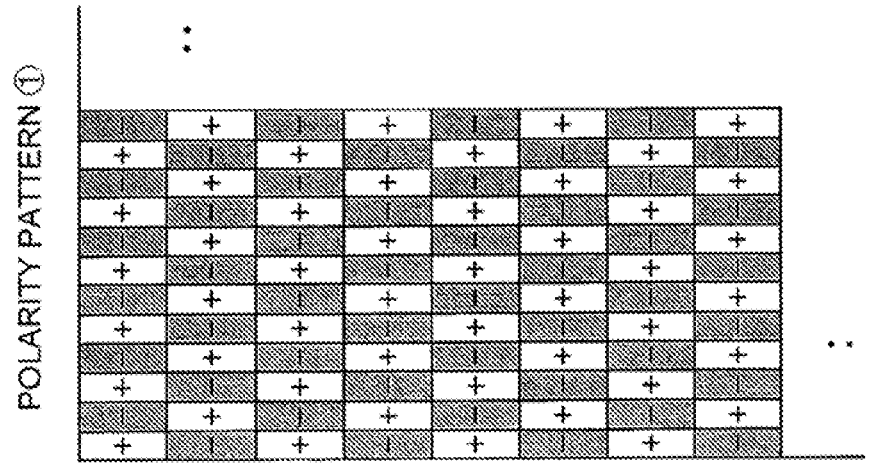
FIG. 3A and FIG. 3B are two views showing polarities of each pixel of two successive frames when a dot inversion drive is adopted.
Figure 3A:
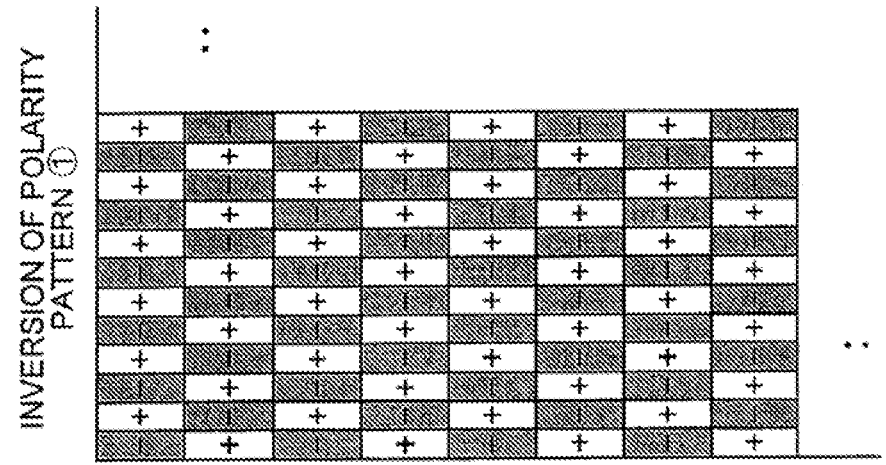
Figure 4A:
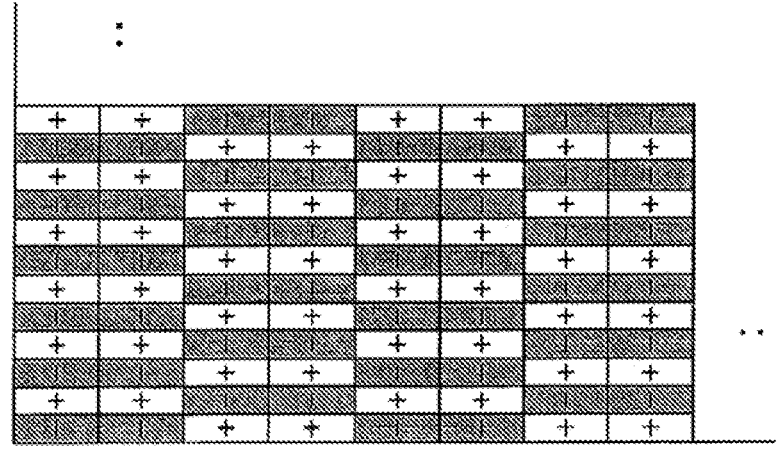
FIG. 4A and FIG. 4B are two views showing polarities of each pixel of two successive frames when a vertical 2-dot inversion drive is adopted.
Figure 4B:
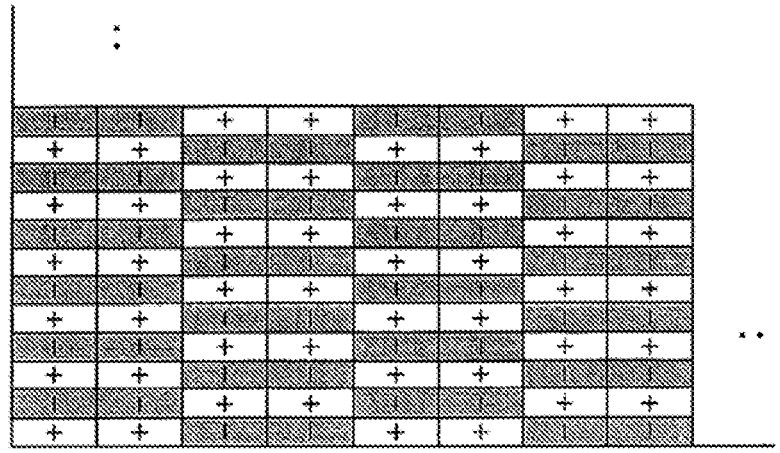
Figure 5A:
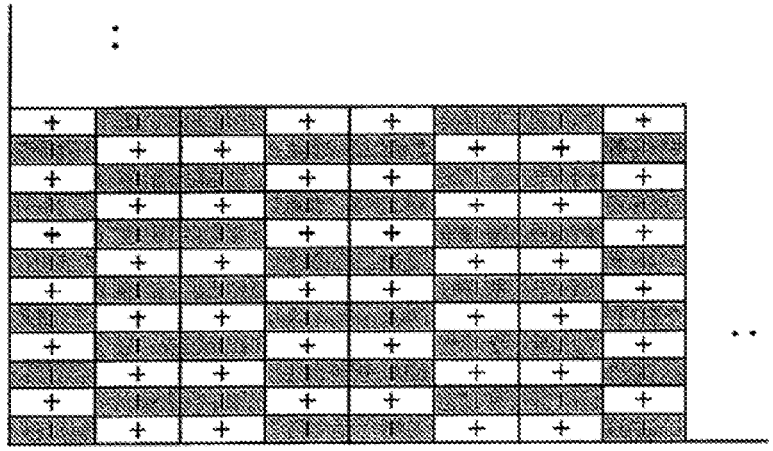
FIG. 5A and FIG. 5B are two views showing polarities of each pixel of two successive frames when another example of the vertical 2-dot inversion drive is adopted.
Figure 5B:
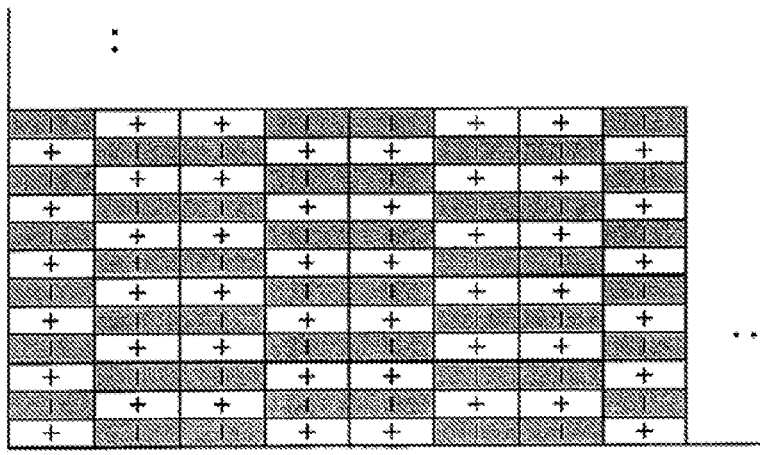

FIG. 6 is a timing chart describing one example of the POL signal in the first exemplary embodiment using a case of dot inversion drive shown in FIG. 3 by way of example.

When the POL is high, for example, the source driver 4 outputs a positive voltage to the odd-numbered source lines H1, H3, H5, H7, . . . and a negative voltage to the even-numbered source lines H2, H4, H6, H8, and when the POL is low, for example, the source driver 4 outputs the negative voltage to source lines H1, H3, H5, H7, . . . , and the positive voltage to the even-numbered source lines H2, H4, H6, H8.

The drive control unit 9 counts 0 to 1 frame of the VSP_i base point by the 1 bit frame counter of the VSP_i cycle, and at the same time counts 0 to 3 by the 2 bit line counter of the DLP cycle from the VSP_i. The drive control unit 9 then generates an internal signal (POL_i) that is Low when line counter=2 in 0 frame, Low when line counter=0 in one frame, and high in other cases.

The drive control unit 9 counts 0 to 1 frame of the VSP_b base point by the 1 bit frame counter of the incorporated VSP_b cycle, and at the same time counts 0 to 3 by the 2 bit line counter of the DLP cycle from the VSP_b. The drive control unit 9 then generates an internal signal (POL_b) that is Low when line counter=2 in 0 frame, Low when line counter=0 in one frame, and high in other cases.

The drive control unit 9 finally outputs a POL, which is AND of the internal signal (POL_i) and the internal signal (POL_b), to the source driver 4. The source driver 4 inputs the POL as shown in FIG. 6 to execute the dot inversion drive in which the write polarity of the line image portion inverts in frame cycle of VSP_i base point, and the write polarity of the black image portion inverts in frame cycle of the VSP_b base point.

According to such configuration, the drive control unit 9 can invert the polarity of the video signal and the black signal in frame cycle having independent timings as the base point by simply incorporating a frame counter and a line counter for black signal inversion independently.

Therefore, the drive control unit 9 serves as a frame polarity inverting device for inverting the application voltage polarity to the pixel corresponding to the video signal in frame cycle having the start of video display scanning as the base point, and inverting the application voltage polarity to the pixel corresponding to the black image signal in frame cycle having the start of black image display scanning as the base point by controlling the POL. Thus, DC voltage is prevented from being applied to the liquid crystal.

The black insertion signal converting unit 8, the drive control unit 9, and the black insertion rate setting unit 10 in the controller 7 may have the functional contents thereof programmed to be executed by a computer.

FIGS. 7A and 7B are timing charts of a signal propagating through the image display device of the first exemplary embodiment.

FIG. 7A is a timing chart for a case where the line image signal is provided to the pixel 6 on the gate lines V1 to Vi corresponding to the gate driver 5A, and the black image signal is provided to the pixel 6 on the gate lines V(i+1) to Vj corresponding to the gate driver 5B; and FIG. 7B is a timing chart for a case where the black image signal is provided to the pixel 6 on the gate lines V1 to Vi corresponding to the gate driver 5A, and the line image signal is provided to the pixel 6 on the gate lines V(i+1) to Vj corresponding to the gate driver 5B, in contrast to FIG. 7A.

As shown in FIG. 7A, the VOE_i is input to the gate driver 5A when providing the line image signal to the pixel 6 on the corresponding gate lines V1 to Vi, whereby the gate-ON signal is converted to the image display gate-ON signal having a pulse width same as the line image signal output period of the source driver 4, and is sequentially provided to the gate lines V1 to Vi from the gate driver 5A.

The VOE_b is input to the gate driver 5B when providing the black image signal to the pixel 6 on the gate lines V(i+1) to Vj, whereby the gate-ON signal is converted to the black display gate-ON signal having a pulse width same as the black image signal output period of the source driver 4, and is sequentially provided to the gate lines V(i+1) to Vj from the gate driver 5B.

Thus, in the first exemplary embodiment, the video signal or the black image signal can be written to different pixel lines in 1H period (one horizontal scanning period).

The operation of the image display device of the first exemplary embodiment will now be described. FIG. 8 is a view describing the operation of the image display device of the present exemplary embodiment. Each step in the method of driving the image display device of the present invention will also be shown to be simultaneously described.

First, the black image insertion rate for every frame period is determined and set based on the video signal input by the black insertion rate setting unit 10 (black insertion rate setting step). In the black insertion signal converting unit 8, the black image signal is inserted between the line image portions of the input video signal, and output to the drive control unit 9 as a black insertion video signal (black insertion signal converting step).

When the black insertion video signal is output from the drive control unit 9 to each source driver 4, various drive control signals are output to the gate drivers 5A to 5N and each source driver 4 in synchronization therewith.

In the first exemplary embodiment, a plurality of gate drivers capable of collectively enabling the gate output is used, and the gate drivers 5A to 5N are controlled by an independent output enable signal (VOE_i or VOE_b) from the drive control unit 9.

As shown in FIG. 2, the black insertion video signal is input from the drive control unit 9 to the source driver 4. The source driver 4 alternately outputs the video signal and the black image signal to the source lines H1 to Hn based on the input black insertion video signal (black insertion video signal providing step).

As shown in FIG. 8, the VSP_i indicating the start of the frame is input from the drive control 9 to the gate driver 5A along with the VOE_i (video start pulse input step), which VSP_i shifts the gate lines V1 to Vi as a gate-ON signal in synchronization with the similarly input clock signal (VCK) and turns ON the TFT 12 of the pixel 6 on each gate line V1 to Vi. Meanwhile, the VOE_i is input to the gate driver 5A.

Subsequently, when scanning in the gate driver 5A is terminated, the VSP_i is shift input to the gate driver 5B, and at the same time, the VOE_i is input to the gate driver 5B from the drive control unit 9. In the gate driver 5B, the VSP_i shifts the corresponding gate lines V(i+1) to Vj as a gate-ON signal, and the VOE_i is input to the gate driver 5B during the shifting period. The VSP_i is then similarly shift input to the gate driver 5N, and at the same time, the VOE_i is input from the drive control unit 9. In the gate driver 5N as well, the VSP_i shifts the corresponding gate lines V(1+1) to Vm as a gate-ON signal, and the VOE_i is input during the shifting period (video scanning step). The VOE_b is input to the gate drivers 5A to 5N at other than the above periods.

The VSP_b from the drive control unit 9 is input to the gate driver 5A once within the frame period according to the timing determined by the black insertion rate setting unit 10 (black display start pulse input step), and similarly, the VSP_b shifts the corresponding gate lines V1 to Vi as a gate-ON signal by the clock signal (VCK) of the gate driver 5A and turns ON the TFT of the pixel 6 on each gate line V1 to Vi. During such black image display scanning, the VOE_b is input to the gate driver 5A.

When the black image display scanning in the gate driver 5A is terminated, the VSP_b is shift input to the gate driver 5B, and the VSP_b shifts the corresponding gate lines V(i+1) to Vj as a gate-ON signal. The VOE_b is also input to the gate driver 5B during the shifting period. Thereafter, the VSP_b is shift input to the gate driver 5N, similarly, and the black image display scanning in the gate driver 5N is started (black scanning step).

Therefore, in the first exemplary embodiment, the video display scanning start pulse (VSP_i) input for writing the video signal of one time and the black display scanning start pulse (VSP_b) input for writing the black image signal of one time are performed on the gate driver 5A within one frame period.

According to such configuration, the screen display realizes a black image insertion drive in which the black band scrolls through the screen during one frame, as shown in FIG. 9B. The width of the black band is determined by the timing of input of the black display scanning start pulse (VSP_b) with respect to the input of the video display scanning start pulse (VSP_i). Furthermore, according to the first exemplary embodiment, the holding time of the video signal and the holding time of the black image signal become constant at all the pixels 6 in the screen by continuing the write of the black image signal in the blanking period between the frames, as shown in FIG. 8, and the in-plane luminance difference caused by the difference in holding times can be eliminated.

The VSP_b can be input at an arbitrary timing as long as it is a timing at which the pixel line of the video signal and the black image signal is not simultaneously selected by one gate driver as in the black VSP settable range shown in FIG. 10, and restrictions such as timing of break of the gate driver as in the display device of the related art are not imposed. The black insertion rate thus can be finely adjusted, and an optimum black insertion rate corresponding to the usage environment can be set in view of the balance between the effect of reducing the moving image blur, which is the merit of black image insertion, and lowering in luminance, which is the demerit of black image insertion.

In the first exemplary embodiment, the optimum black insertion drive can be applied regardless of the liquid crystal driving method according to the display panel 1, which may be TN type, IPS type, VA type, OCB type, or the like.

Furthermore, the video signal is frame inverted with the input of the VSP_i as the base point (video signal polarity inversion step), and independent therefrom, the black signal is frame inverted with the input of the VSP_b as the base point (black image signal polarity inversion step) when the drive control unit 9 controls the POL, as shown in FIG. 8.

According to such configuration, the order of inversion is prevented from reversing near the center of the screen, and display luminance difference and burning with the line at which the polarity inversion switches as the boundary caused by variation in the field through of the display panel 1 surface and the variation in positive and negative of the application voltage are eliminated. Furthermore, since this configuration merely has the drive control unit 9 independently equipped with the black signal 15 inversion counter, the cost does not increase, and switching of the black insertion rate can be flexibly responded.

In the first exemplary embodiment, the moving image blur is alleviated by inserting the black image display between each video frame in the image display device, but it is not limited to black display, and gray display such as gray may be inserted. In this case, lowering in luminance can be suppressed in addition to reducing the moving image blur but the contrast with the color region lowers, and thus a configuration of setting an optimum gray insertion rate in view of such is adopted.

In the first exemplary embodiment, the black insertion rate setting unit 10 determines the black image insertion rate for every frame period by referencing the input video signal, and sets the timing to input the VSP_b to the gate driver 5A according to the determined black image insertion rate, but the configuration is not limited thereto, and the black insertion rate setting unit 10 may set the timing to input VSP_b to the gate driver 5A according to the timing data externally input through operation of the user or the like.

The first exemplary embodiment described above can change the black image insertion rate by changing the timing to input the VSP_b to the gate driver 5A, can perform normal drive in which the black image insertion is not performed by not inputting the VSP_b, and can easily switch the black image insertion rate. Therefore, when used in monitors, a bright screen with small amount of flickers is provided without performing black insertion, and for moving image display such as TV, a screen performed with black insertion is provided for reducing moving image blur, and thus a display corresponding to the usage state of the user can be provided.

Applications such as continuously switching the black image insertion rate depending on the scene of the video such as from a static screen displaying landscape etc. to an active screen displaying sports etc. are also possible.

The first exemplary embodiment can also prevent display luminance difference and burning having the line at which the polarity inversion switches as a boundary caused by variation in field through of the display panel 1 surface and variation in positive and negative of the application voltage since the video signal and the black signal have the write polarity inverted in frame cycle having the timing independent from each other as the base point.

Second Exemplary Embodiment

Next, a second exemplary embodiment of the present invention will be described.

FIG. 12 is a view showing a configuration of an image display device of a second exemplary embodiment according to the present invention. Same reference numerals are denoted for components same as in the first exemplary embodiment shown in FIG. 1A. As shown in FIG. 12, the second exemplary embodiment has a backlight 21 arranged at the rear surface of the display panel 1 when seen from the user, in addition to the configuration similar to the first exemplary embodiment. A black insertion rate setting unit 20 has a function of temporarily storing information for one frame of the input video signal sequentially input for every frame, and comparing the video signal of one frame of the input video signal and the video signal of the previous frame that is temporarily stored to determine the black image insertion rate and the light control luminance of the backlight based on the changed number of data, and a drive control unit 29 has a function of adjusting the light control luminance of the backlight 21 based on the determination of the black insertion rate setting unit 20.

Similar to the first exemplary embodiment, the VSP_b from the drive control unit 9 is input to the gate driver 5A according to the timing determined by the black 10 insertion rate setting unit 20, where the video signal is frame inverted with the input of the VSP_i as the base point, and independent therefrom, the black signal is frame inverted with the input of the VSP_b as the base point when the drive control unit 9 controls the POL.

Figure 13:
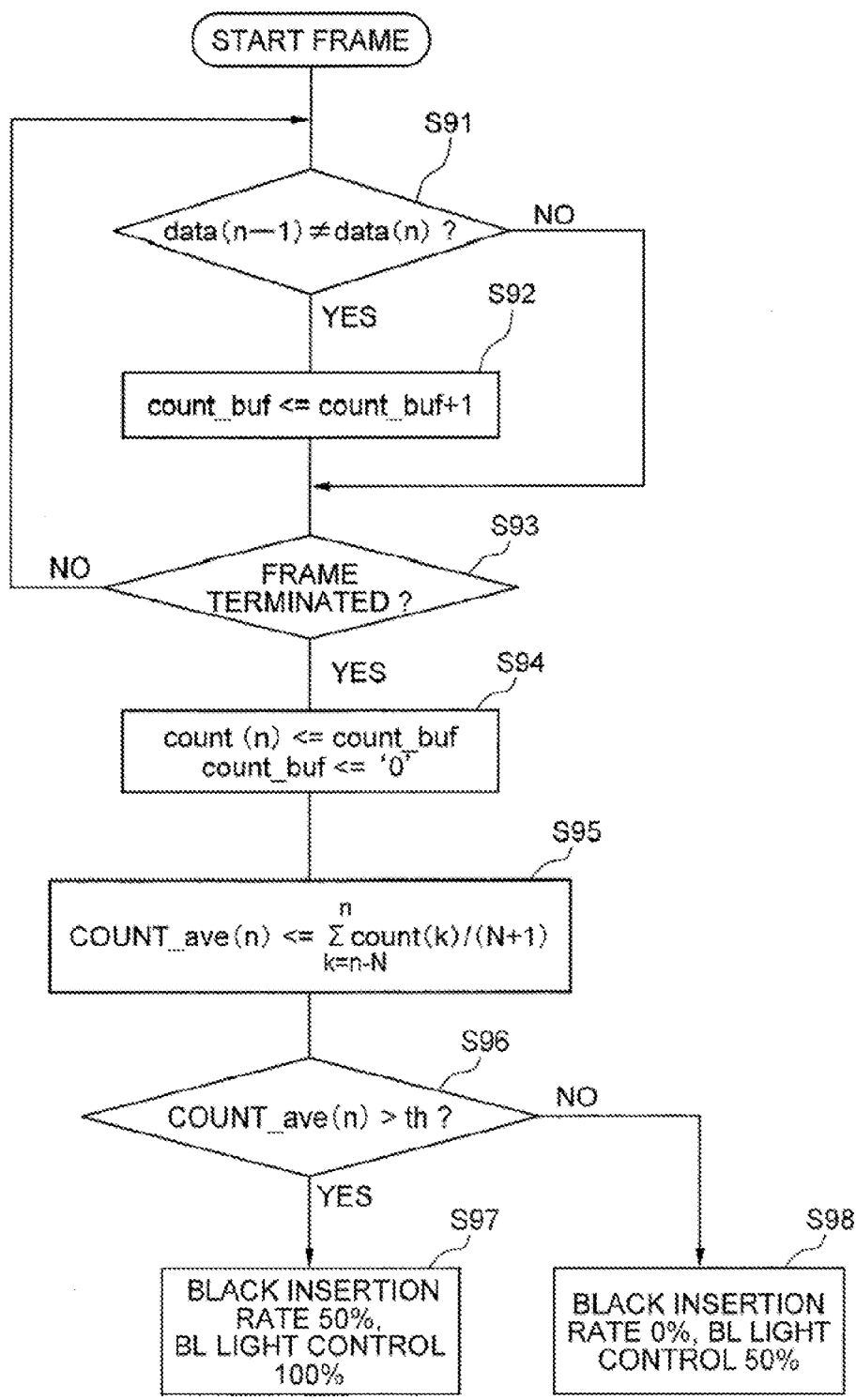
FIG. 13 is a flowchart showing the operation of a black insertion rate setting unit according to the exemplary embodiment shown in FIG. 12.

FIG. 13 is a flowchart showing the operation of the black insertion rate setting unit 20 in the image display device of the second exemplary embodiment.

The black insertion rate setting unit 20 compares current frame data "data (n)" and previous frame data "data (n−1)", and counts the changed data for one frame (FIG. 13: steps S91 to S93). The counted information is moving averaged over a few frames and smoothened (FIG. 13: step S95), and threshold determined (FIG. 13: step S96) to determine whether the image is a static image or a dynamic image.

If the determination result suggests static image, black insertion is not performed for example, and the light control luminance of the backlight 21 is set to be 50% (FIG. 13: step S98), whereas if the determination result suggests dynamic image, the black insertion rate is switched to be 50% for example, to reduce the moving image blur and the light control luminance of the backlight 21 is switched to be 100% (FIG. 13: step S97, black insertion rate setting step).

Figure 14:
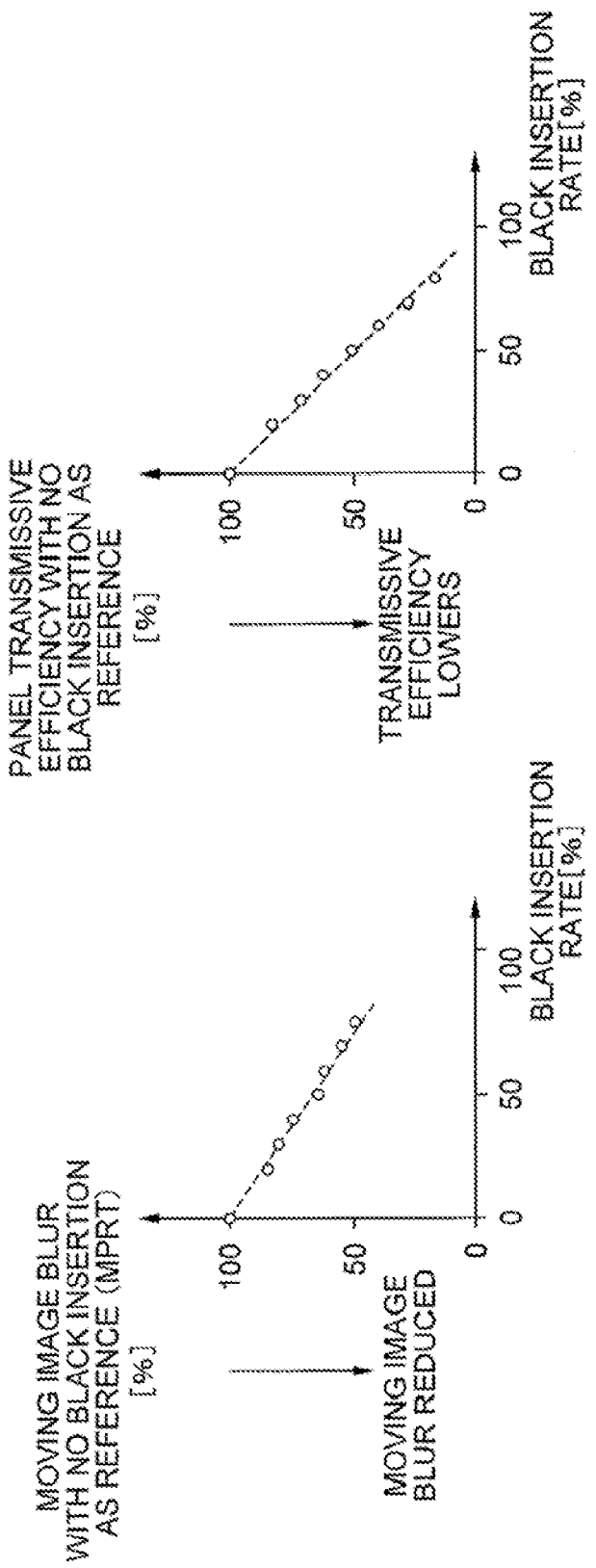
FIG. 14 is a view showing relation characteristics of the black image insertion rate, and the moving image blur and transmissive efficiency in the display panel of the present invention.

According to such configuration, the black insertion rate can be switched according to the scene of the video, and the moving image blur can be reduced as necessary. The light of the backlight 21 is controlled with the black image insertion because the transmissive efficiency of the panel lowers in exchange for improvement of the moving image blur by black image insertion, as shown in FIG. 14. With this, the change in luminance due to switching of black insertion can be prevented, and in the case of static video where black image insertion is unnecessary, power consumption can be reduced by performing light control of the backlight 21.

Figure 16:
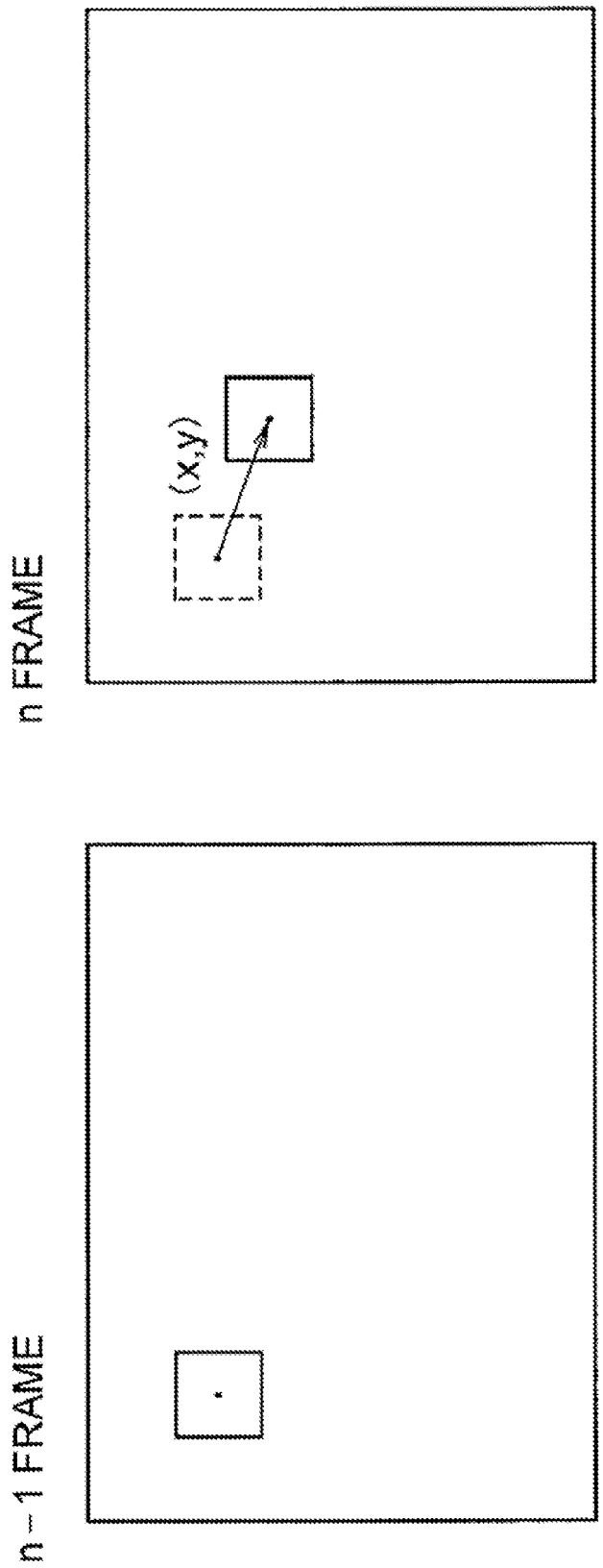
FIG. 16 is a view showing the operation of the black insertion rate setting unit in the exemplary embodiment shown in FIG. 12.
Figure 17:
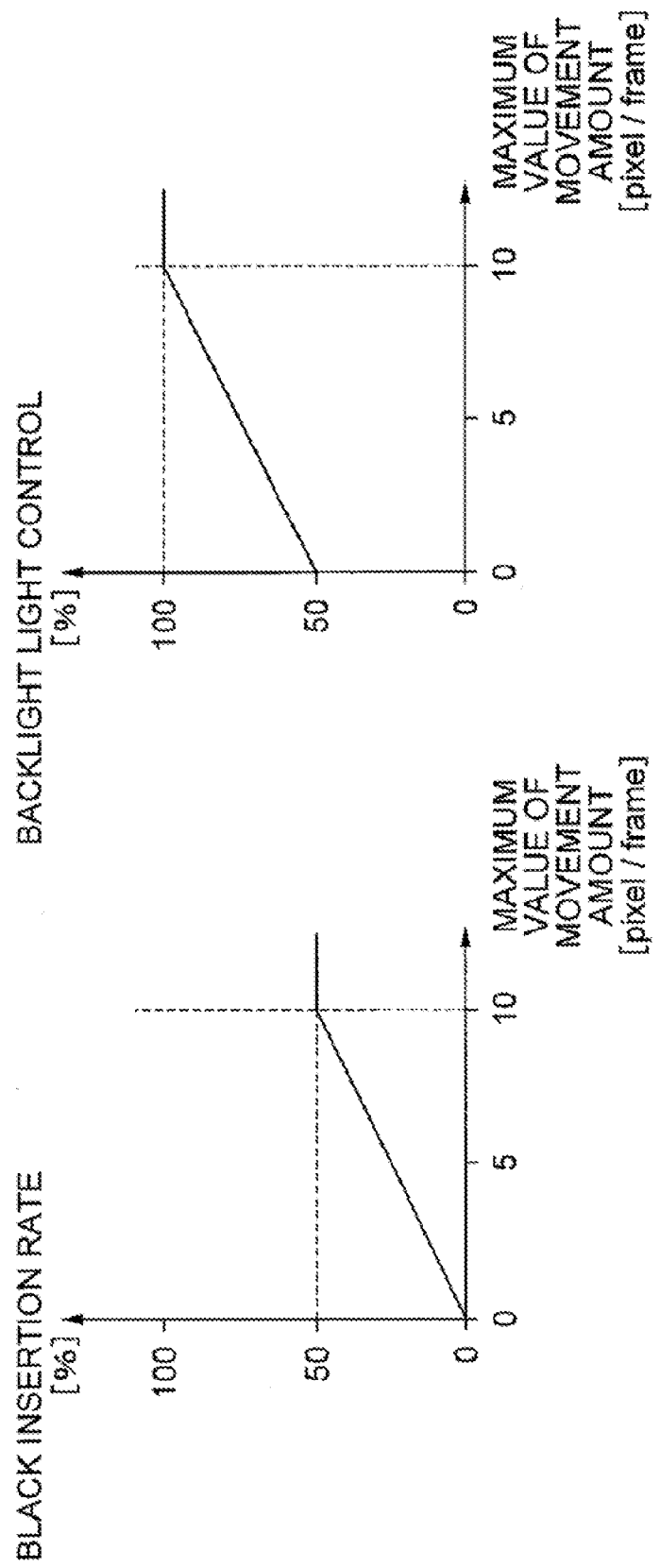
FIG. 17 is a view showing a relationship characteristic of the maximum value of the movement distance of each block calculated by the black insertion rate setting unit and the black insertion rate and light control luminance of a backlight in the exemplary embodiment shown in FIG. 12.
Figure 18:
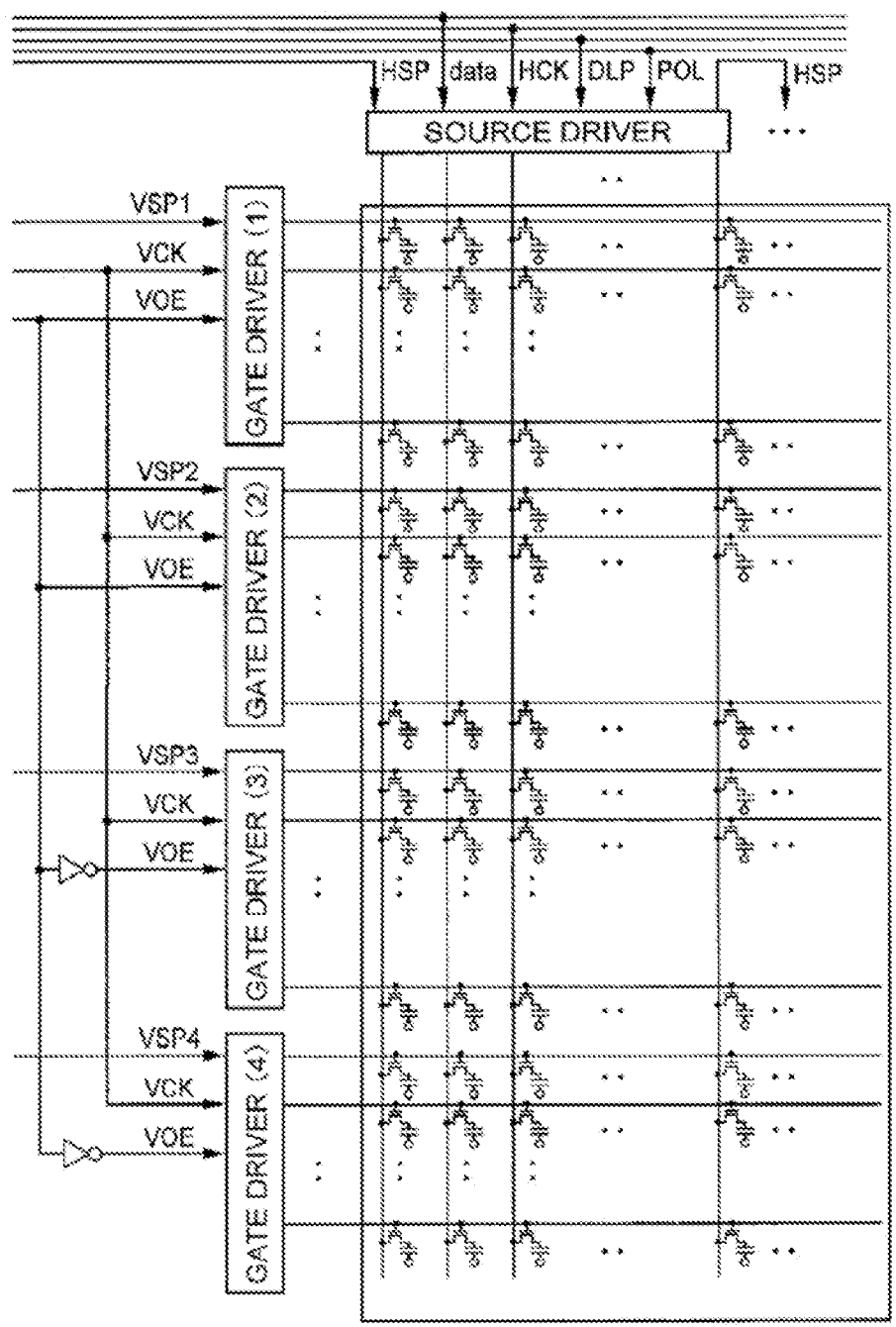
FIG. 18 is a view showing a configuration of an image display device of a related art.
Figure 19:
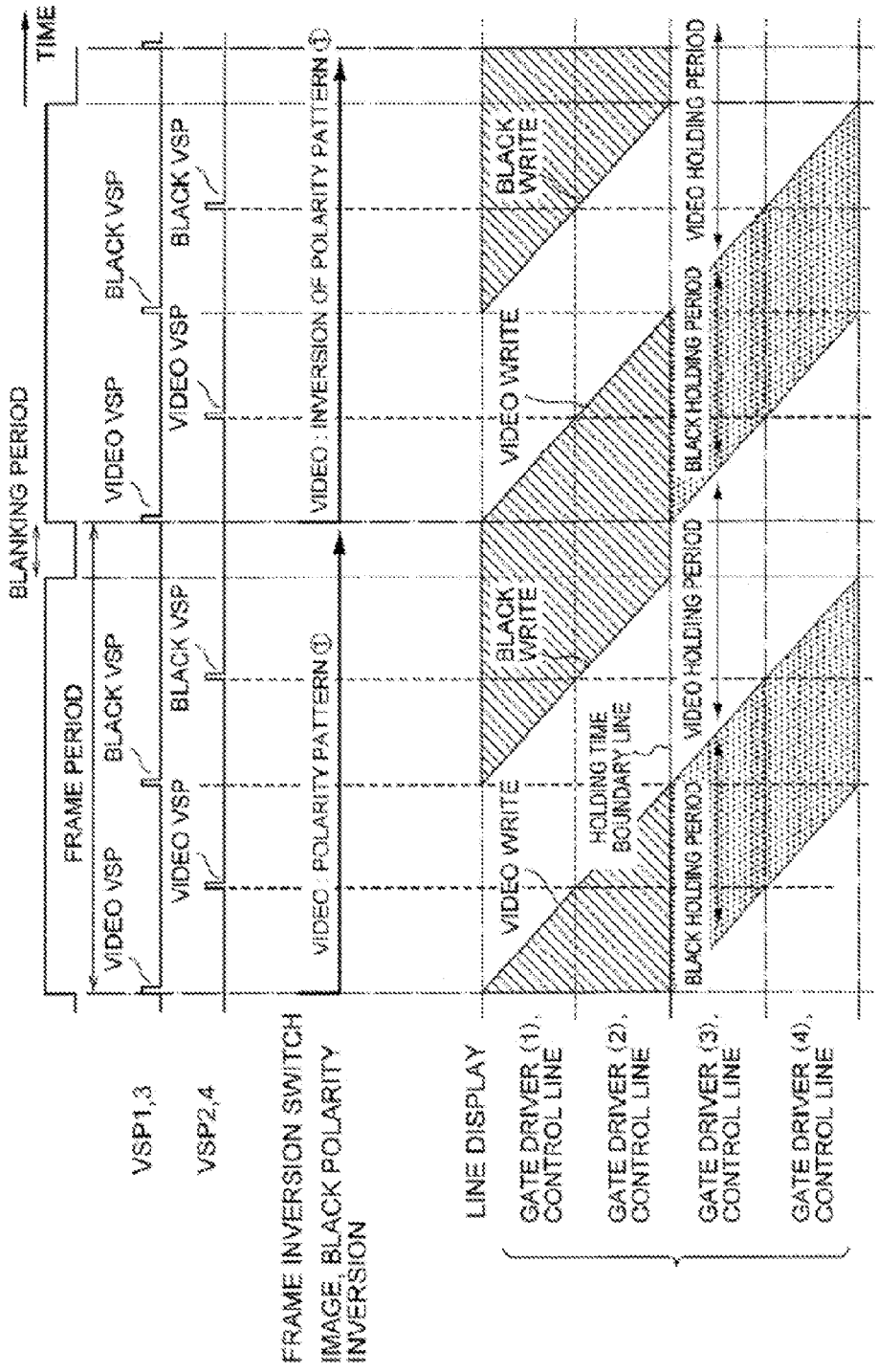
FIG. 19 is an explanatory view showing the operation of the image display device of the related art.
Figure 20:
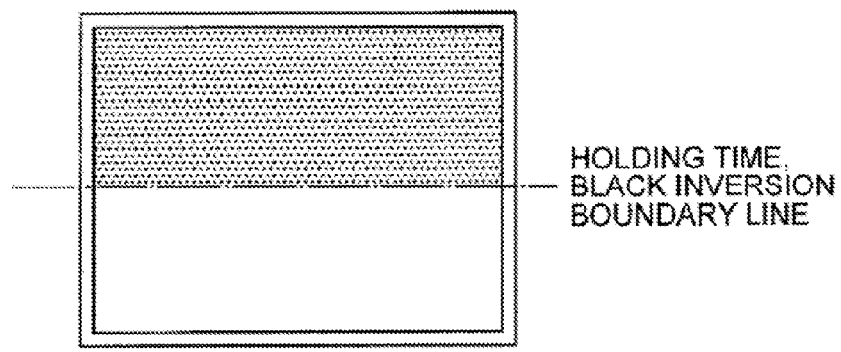
FIG. 20 is an explanatory view showing a display screen in the image display device of the related art.

Another example of the operation of the black insertion rate setting unit 20 in the second exemplary embodiment is shown in FIGS. 15 to 17.

Another method for the black insertion rate setting unit 20 to determine the black image insertion rate and the light control luminance of the backlight includes, firstly, dividing one frame into a plurality of blocks set in advance, as shown in FIG. 15. And then, the distance the image of an arbitrary block moves from the previous frame to the current frame is calculated, as shown in FIG. 16.

The method of calculating the distance includes detecting the position of the block of the previous frame and the block in which the average absolute value error is the smallest from the current frame using tree search method and the like, and obtaining the distance the relevant block has moved.

The maximum value of the calculated movement distance of each block, and the black insertion rate and the light control luminance of the backlight 21 at the relevant point are shown in FIG. 17. According to such configuration, the power consumption of the backlight can be reduced by continuously switching the black insertion rate according to the movement of the scene of the video, and performing the black image insertion of requisite minimum according to the extent of movement.

Another exemplary embodiment of the present invention will now be described. A hold type image display system according to the exemplary embodiment of the present invention relates to an image display device equipped with a display panel in which a plurality of gate lines and a plurality of source lines are arranged respectively intersecting each other in a grid form, a pixel being formed at each intersection of the gate lines and the source lines; the image display device including an image scanning device for executing an image display scanning for displaying a video on a display panel according to an input video signal; a black scanning device for starting and executing a black image display scanning for displaying a black screen on a display panel at an arbitrary timing within one video frame period in the video display scanning; and a frame polarity inverting device for inverting the polarity of an application voltage to the pixel by the video scanning device in frame cycle having the start of video display scanning as a base point, and inverting the polarity of an application voltage to the pixel by the black scanning device in frame cycle having the start of black image display scanning as the base point.

According to such image display device, in a liquid crystal display device for performing black insertion drive by inserting a black image in one frame, the video signal and the black signal have the write polarity inverted at the frame cycle having independent timings as the base point, respectively, and thus the display luminance difference and burning having the line at which the polarity inversion switches as a boundary caused by variation in field through of the display panel surface and variation in positive and negative of the application voltage can be prevented.

The hold type image display device according to the exemplary embodiment of the present invention includes a display panel having a configuration in which a plurality of gate lines and a plurality of source lines are arranged respectively intersecting each other in a grid form, a pixel being formed at each intersection of the gate lines and the source lines; a source driver for providing a black insertion video signal alternately including a line image portion and a black image portion to each source line; and a plurality of gate drivers arranged with respect to gate line groups, the plurality of gate lines being divided into a number of groups, for sequentially providing a gate-ON signal to each corresponding gate line; and a drive control unit for individually providing an output enable signal to each gate driver and independently controlling the gate output of each gate driver; where the drive control unit has a function of outputting a video start pulse for writing the line image portion to a first gate driver and outputting a black display start pulse for writing the black image portion to a first gate driver at an arbitrary timing within one video frame period, and inverting the write polarity of the line image portion in frame cycle having the output of the video start pulse as a base point and inverting the write polarity of the black image portion in frame cycle having the output of the black display start pulse as a base point.

According to such image display device, the gate driver is arranged for each gate line group formed from a plurality of gate lines, the enable of each gate driver is individually controlled, and the black display start pulse is input to the gate driver at a timing different from the video start pulse, and thus the ratio between the video display time and the black image display time in the black insertion drive (hereinafter referred to as black video insertion rate) can be continuously adjusted instead of being driver segmented. Furthermore, since the image signal and the black signal have the write polarity inverted in frame cycle with independent timing as the base point, display luminance difference and burning having the line at which the polarity inversion switches caused by variation in field through of the display panel surface and variation in positive and negative of the application voltage can be prevented.

In such image display device, the drive control unit may also variably control the timing of output of a black display start pulse with respect to output of a video start pulse. With this, the black image insertion rate for every frame can be arbitrarily changed by changing the timing of the black display start pulse output.

In the above image display device, the drive control unit may have a function of individually providing to each gate driver a video display enable signal for validating the gate output of the gate driver only during the period the line image portion of the black insertion video signal is being provided to the source line, or a black display enable signal for validating the gate output of the gate driver only during the period the black image portion of the black insertion video signal is being provided to the source line. With this, the execution of the video display scanning or the black image display scanning can be individually controlled with respect to each gate driver.

In the above image display device, each gate driver may provide to the corresponding gate line, the video display gate-ON signal for writing only the line portion of the black insertion image signal to the pixel according to the video display enable signal, and provide to the corresponding gate line the black display gate-ON signal for writing only the black image portion of the black insertion video signal to the pixel according to the black display enable signal. With this, each gate driver can switch and execute the video display scanning or the black image display scanning.

The image display device may also includes a black insertion rate setting unit for setting the timing of the black display start pulse output by the drive control unit according to the operation environment. With this, the black image insertion rate for every frame can be set from a large range according to each usage state.

Further, in the above image display device, the black insertion rate setting unit may have a function of determining the black image insertion rate for every frame period based on the input video signal, and the timing of the black display start pulse output may be set based on the determined black image insertion rate. With this, the black image insertion rate can be set according to the content of the displaying video.

Further, in the image display device, the black insertion rate setting unit may have a function of temporarily storing information for one frame of the input video signal sequentially input for every frame, and comparing the video signal of one frame of the input video signal and the video signal of the previous frame that is temporarily stored to determine the black image insertion rate based on the changed data. With this, the optimum black image insertion rate can be determined according to the content of the displaying image.

Furthermore, the image display device may also include a backlight arranged at the rear surface of the display panel, where the black insertion rate setting unit may have a function of temporarily storing information for one frame of the input video signal sequentially input for every frame, and comparing the video signal of one frame of the input video signal and the video signal of the previous frame that is temporarily stored to determine the black image insertion rate and the light control luminance of the backlight based on the changed data. With this, the backlight is light controlled according to black insertion, and black insertion drive can be executed while preventing change in luminance due to switching of black insertion.

Furthermore, in the above image display device, the drive control unit may provide the image display enable signal to the gate driver for shift outputting the gate-ON signal to each corresponding gate line according to the video start pulse input until such shift output is terminated, and may provide the black display enable signal to other gate drivers. With this, the black display start pulse input with respect to the gate driver at a timing of high degree of flexibility becomes possible, and the black image insertion rate can be continuously adjusted.

Furthermore, the image display device may include a black insertion signal converting unit for inserting the black image signal between the line image portions in the input image signal, and outputting to the source driver as a black insertion video signal. With this, the black insertion video signal for the source driver to alternately output the line image portion and the black image portion to each source line is obtained.

In the above image display device, the black insertion video signal may also include the black image signal even in a blanking period in the input video signal. With this, the write of black is performed without stopping even in the blanking period between the frames with respect to the write of the black signal over a plurality of video frames, and thus the in-plane luminance difference caused by difference in black image holding periods in the display panel can be eliminated.

In the image display device, the black insertion video signal may include a gray signal in place of the black image signal. With this, the lowering in luminance due to black insertion drive is alleviated.

A method of driving a hold type image display device according to an exemplary embodiment is a method of driving an image display device including a display panel in which a plurality of gate lines and a plurality of source lines are arranged respectively intersecting each other in a grid form, a pixel being formed at each intersection of the gate lines and the source lines; a source driver for providing a video signal to each source line; a plurality of gate drivers, arranged with respect to gate line groups, a plurality of gate lines being divided into a number of groups, for sequentially providing a gate-ON signal to each corresponding gate line; and a drive control unit for individually providing an output enable signal to each gate driver; the method including a black insertion video signal providing step in which the source driver starts to provide to each source line a black insertion video signal alternately including a line image portion and a black image portion; a video start pulse input step in which the drive control unit inputs, to a first gate driver, a video display start pulse for writing the line image portion in synchronization with the black insertion video signal providing step; an image scanning step in which an image display scanning of sequentially providing to each gate line a video display gate-ON signal for writing only the line image portion of the black insertion video signal to the pixel is executed in order from the first gate driver; a black display start pulse input step in which the drive control unit inputs, to the first gate driver, a black display start pulse for writing the black image portion at an arbitrary timing within one video frame; a black scanning step in which a black image display scanning of sequentially providing, to each gate line, a black display gate-ON signal for writing only the black image portion of the black insertion video signal to the pixel is executed in order from the first gate driver; a video signal polarity inverting step of inverting the write polarity of the line image portion in frame cycle having the output of the video start pulse as a base point; and a black signal polarity inverting step of inverting the write polarity of the black image portion in frame cycle having the output of the black display start pulse as a base point.

In such driving method, each gate driver may output the video display gate-ON signal according to the video display enable signal for validating the gate output of the gate driver only during the period the line image portion of the black insertion video signal is being provided to the source line in the video scanning step, and each gate driver may output the black display gate-ON signal according to the black display enable signal for validating the gate output of the gate driver only during the period the black image portion of the black insertion video signal is being provided to the source line in the black scanning step.

The above driving method may include a black insertion rate setting step of setting the timing of the black display start pulse output by the drive control unit according to the operation environment.

According to the above driving method, in the black insertion rate setting step, information for one frame of the input video signal sequentially input for every frame may be temporarily stored, the video signal of one frame of the input video signal and the video signal of the previous frame that is temporarily stored may be compared to determine the black image insertion rate based on the changed data, and the timing of the black display start pulse output is set based on the determined black image insertion rate.

Furthermore, according to the driving method, in the black inserting rate setting step, information for one frame of the input video signal sequentially input for every frame may be temporarily stored, the video signal of one frame of the input video signal and the video signal of the previous frame that is temporarily stored may be compared to determine the black image insertion rate and the light control luminance of the backlight arranged at the rear surface of the display panel in advance based on the changed data, and the timing of the black display start pulse output and the light control luminance of the backlight are set based on such determination.

The driving method may includes a black insertion signal converting step of inserting the black image signal between the line image portions in the input image signal, and outputting to the source driver as a black insertion video signal, before the black insertion video signal providing step.

In the above driving method, the black insertion image signal may include the black image signal even in a blanking period in the input video signal.

In the above method of driving the image display device, the black insertion video signal may include a gray signal in place of the black image signal.

Similar to the image display device, according to the above method of driving the image display device, the black insertion rate can be finely set in view of the balance between reducing the moving image blur, which is the merit, and lowering in luminance, which is the demerit, and display luminance difference and burning having the line at which the polarity inversion switches caused by variation in field through in the display panel surface and variation in positive and negative of the application voltage can be prevented.

An image display device driving program according to an exemplary embodiment of the present invention may cause a computer for controlling the operation of the image display device to execute processes, the image display device including a display panel in which a plurality of gate lines and a plurality of source lines are arranged respectively intersecting each other in a grid form, a pixel being formed at each intersection of the gate lines and the source lines; a source driver for providing a video signal to each source line; and a plurality of gate drivers, arranged with respect to gate line groups, the plurality of gate lines being divided to groups, for sequentially providing the gate-ON signal to each corresponding gate line; where the program causes the computer to execute a video signal providing process of outputting a black insertion video signal alternately including a line image portion and a black image portion from the source driver to each source line: a drive controlling process of individually providing an output enable signal to each gate driver and independently controlling the gate output of each gate driver; a video start pulse output process of outputting a video start pulse input for writing the line image portion to a first gate driver; a black display start pulse output process of outputting a black display start pulse for writing the black image portion to the first gate driver at an arbitrary timing within one video frame; a video signal polarity inverting process of inverting a write polarity of the line image portion in frame cycle having the output of the video start pulse as a base point; and a black signal polarity inverting process of inverting a write polarity of the black image portion in frame cycle having the output of the black display start pulse as a base point.

In the above image display device driving program, the drive controlling process may be specified to a content of individually providing to each gate driver a video display enable signal for validating the gate output of the gate driver only during the period the line image portion of the black insertion video signal is being provided to the source line, or a black display enable signal for validating the gate output of the gate driver only during the period the black image portion of the black insertion video signal 10 is being provided to the source line.

Furthermore, the image display device driving program may cause the computer to execute a black insertion rate setting process of setting the timing of the black display scanning process according to the operation environment.

In the above image display device driving program, the black insertion rate setting process may be specified to a content of temporarily storing information for one frame of the input video signal sequentially input for every frame, comparing the video signal of one frame of the input video signal and the video signal of the previous frame that is temporarily stored to determine the black image insertion rate for every frame period based on the changed data, and setting the timing of the black display scanning process based on the determined black image insertion rate.

Furthermore, according to the above image display device driving program, the black inserting rate setting process may be specified to a content of temporarily storing information for one frame of the input video signal sequentially input for every frame, comparing the video signal of one frame of the input video signal and the video signal of the previous frame that is temporarily stored to determine the black image insertion rate and the light control luminance of the backlight arranged at the rear surface of the display panel in advance based on the changed number of data, and setting the timing to start the black display scanning for every gate line group and the light control luminance of the backlight based on such determination.

The above image display device driving program may cause a computer to execute a black insertion video signal creating process of inserting the black image signal between the line image portions in the input video signal, and outputting to the source driver as a black insertion video signal.

In the above image display device driving program, the black insertion video signal may include the black image signal even in a blanking period in the input video signal.

In the above image display device driving program, the black insertion video signal may include a gray signal in place of the black image signal.

Similar to the image display device, according to the image display device driving program, the black image insertion rate can be finely set in view of the balance between reducing the moving image blur, which is the merit, and lowering in luminance, which is the demerit, and display luminance difference and burning having the line at which the polarity inversion switches caused by variation in field through in the display panel surface and variation in positive and negative of the application voltage can be prevented.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A hold type image display system for displaying a video on a display panel by controlling a video signal to be input to a source line and a gate line of the display panel, the hold type image display system comprising:
    a source driver outputting the video signal to the source line; wherein the source driver confirms data signals and positive or negative from a reference voltage according to a polarity inverting control signal and outputs tone voltages to the source line, and the polarity inverting control signal is a logic AND of a first internal signal and a second internal signal;
    a gate driver outputting a scanning signal to the gate line; and
    a controller receiving an input video signal and controlling the source driver and the gate driver according to the received input video signal;
    wherein the controller outputs the video signal in which a black or gray line is inserted between video lines of the video signal to the source driver, outputs a start pulse signal for writing the video lines for one or more times and a start pulse signal for writing black or gray lines for one or more times to the gate driver within one frame period, and independently determines and inverts a write polarity of the video signal and a write polarity of the black or gray signal in each frame cycle; and the controller scrolls a black band in a screen of the display panel during one frame, wherein the controller determines the write polarity of the video signal according to the first internal signal, and determines the write polarity of the black or gray signal according to the second internal signal that is independent from the first internal signal.

2. The hold type image display system according to claim 1, wherein the controller inverts the write polarity of the video signal with a point of writing the video signal to a first line of the frame as a base point according to the first internal signal, and inverts the write polarity of the black or gray signal with a point of writing the black or gray signal to the first line of the frame as a base point according to the second internal signal.

3. The hold type image display system according to claim 1, wherein the controller inverses the write polarity of the video signal of a first line driven by a first gate driver and the write polarity of the black or gray signal of a second line driven by a second gate driver within each horizontal scanning period in frame periods of in each frame cycle.

4. The hold type image display system according to claim 3, wherein each horizontal scanning period comprises a preceding half horizontal scanning period and a following half horizontal scanning period, the first line is driven by the first gate drive in the preceding half horizontal scanning period, and the second line is driven by the second gate driver in the following half horizontal scanning period.

5. The hold type image display system according to claim 1, wherein the controller changes a timing of input of the start pulse signal to the gate driver to write the black or gray lines with respect to input of the start pulse signal to the gate driver to write the video signal based on black or gray insertion rate information.

6. The hold type image display system according to claim 1, wherein the controller determines a black or gray insertion rate according to a display, and changes a timing of input of the start pulse signal to the gate driver to write the black or gray lines with respect to input of the start pulse signal to the gate driver to write the video lines based on the determined black or gray insertion rate.

7. The hold type image display system according to claim 1, wherein each frame period comprises a formal display period and a blanking period existing between preceding and following formal display periods, the controller outputs the video line signals and the black or gray line signals to the source driver in the formal display period and outputs the black or gray line signals to the source driver during the blanking period.

8. The hold type image display system according to claim 1, wherein the write polarity of the video signal applied to a source line is opposite to the write polarity of the black or gray signal applied to the same source line in each horizontal scanning period.

9. A control system of a hold type image display system for drive displaying a video on a display panel by controlling a video signal to a source line of the display panel in a source driver and controlling a signal to a gate line of the display panel in a gate driver; wherein the source driver confirms data signals and positive or negative from a reference voltage according to a polarity inverting control signal and outputs tone voltages to the source lines, and the polarity inverting control signal is a logic AND of a first internal signal and a second internal signal; the control system comprising:
a controller receiving an input video signal and controlling the source driver and the gate driver according to the received input video signal;
wherein the controller outputs a video signal in which a black or gray line is inserted between video lines of the output video signal to the source driver, outputs a start pulse signal for writing the video lines for one or more times and a start pulse signal for writing black or gray lines for one or more times to the gate driver within one frame period, and independently determines and inverts a write polarity of the video signal and a write polarity of the black or gray signal in each frame cycle; and the controller scrolls a black band in a screen of the display panel during one frame,
wherein the controller inverts the write polarity of the video signal with a point of writing the video signal to a first line of the frame as a base point according to the first internal signal, and inverts the write polarity of the black or gray signal with a point of writing the black or gray signal to the first line of the frame as a base point according to the second internal signal that is independent from the first internal signal.

10. The hold type image display system according to claim 9, wherein the controller separately inverses the write polarity of the video signal of a first line driven by a first gate driver and the write polarity of the black or gray signal of a second line driven by a second gate driver within each horizontal scanning period in each frame cycle.

11. The control system according to claim 9, wherein the write polarity of the video signal applied to a source line is opposite to the write polarity of the black or gray signal applied to the same source line in each horizontal scanning period.

12. A hold type image display method for displaying a video on a display panel by controlling a video signal to a source line of a display panel in a source driver and controlling a signal to a gate line of the display panel in a gate driver, the hold type image display method comprising:
outputting the video signal in which a black or gray line is inserted between video lines of the video signal to the source driver, wherein the source driver confirms data signals and positive or negative from a reference voltage according to a polarity inverting control signal and outputs tone voltages to the source lines, and the polarity inverting control signal is a logic AND of a first internal signal and a second internal signal;
outputting a start pulse signal for writing the video lines for one or more times and a start pulse signal for writing black or gray lines for one or more times to the gate driver within one frame period;
scrolling a black band in a screen of the display panel during one frame; and
inverting a write polarity of the video signal and a write polarity of the black or gray signal in each frame cycle independently, wherein the write polarity of the video signal is inverted with a point of writing the video signal to a first line of the frame as a base point according to the first internal signal, and the write polarity of the black or gray signal is inverted with a point of writing the black or gray signal to the first line of the frame as a base point according to the second internal signal that is different from the first internal signal.

13. The hold type image display method according to claim 12, wherein the write polarity of the video signal of a first line driven by a first gate driver and the write polarity of the black or gray signal of a second line driven by a second gate driver are inverted independently within each horizontal scanning period in frame periods of in each frame cycle.

14. The hold type image display method according to claim 12, wherein a timing of input of the start pulse signal to the gate driver to write the black or gray lines with respect to input of the start pulse signal to the gate driver to write the video lines is changed based on black or gray insertion rate information.

15. The hold type image display method according to claim 12, wherein a black or gray insertion rate is determined according to a display, and a timing of input of the start pulse signal to the gate driver to write the black or gray lines with respect to input of the start pulse signal to the gate driver to write the video lines is changed based on the determined black or gray insertion rate.

16. The hold type image display method according to claim 12, wherein each frame period comprises a formal display period and a blanking period existing between preceding and following formal display periods, the video line signals are output to the source driver in the formal display period, and the black or gray line signals are output to the source driver during the blanking period.

17. The hold type image display method according to claim 12, the preceding and following video signals of one frame unit are compared, and a relationship between a light control luminance of backlight arranged on a rear surface of the display panel and a black or gray insertion rate is adjusted based on the comparison result.

18. The hold type image display method according to claim 12, wherein the write polarity of the video signal applied to a source line is opposite to the write polarity of the black or gray signal applied to the same source line in each horizontal scanning period.

* * * * *